United States Patent
Cao et al.

(10) Patent No.: US 9,282,509 B2
(45) Date of Patent: Mar. 8, 2016

(54) METHOD AND MECHANISM FOR CONSERVING POWER CONSUMPTION OF SINGLE-CARRIER WIRELESS TRANSMISSION SYSTEMS

(75) Inventors: Carl Cao, San Jose, CA (US); Mikhail Royz, Ottawa (CA); Xiao-Dong Li, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 791 days.

(21) Appl. No.: 13/444,277

(22) Filed: Apr. 11, 2012

(65) Prior Publication Data

US 2013/0190027 A1 Jul. 25, 2013

Related U.S. Application Data

(60) Provisional application No. 61/590,392, filed on Jan. 25, 2012.

(51) Int. Cl.
H04B 7/00 (2006.01)
H04W 52/02 (2009.01)

(52) U.S. Cl.
CPC ............ *H04W 52/0206* (2013.01); *Y02B 60/50* (2013.01)

(58) Field of Classification Search
CPC ............................... H04W 36/22; H04B 7/022
USPC .......................................................... 455/509
See application file for complete search history.

(56) References Cited

U.S. PATENT DOCUMENTS

| | | | |
|---|---|---|---|
| 6,584,330 B1 | 6/2003 | Ruuska | |
| 8,880,012 B2 | 11/2014 | Goedken | |
| 8,892,176 B2 | 11/2014 | Kim | |
| 8,897,842 B2 | 11/2014 | Kim | |
| 2006/0276216 A1 | 12/2006 | Tongen | |
| 2007/0243873 A1 | 10/2007 | Jin | |
| 2009/0180428 A1 | 7/2009 | Viswanath | |
| 2011/0195741 A1 | 8/2011 | Kim | |
| 2011/0201334 A1* | 8/2011 | Rosenqvist et al. ......... 455/436 |

FOREIGN PATENT DOCUMENTS

| | | |
|---|---|---|
| EP | 2 107 847 A1 | 10/2009 |
| WO | WO 2010/145336 A1 | 12/2010 |
| WO | WO 2011/064696 A1 | 6/2011 |
| WO | WO 2011/098338 A1 | 8/2011 |
| WO | WO 2011/147450 A1 | 12/2011 |

OTHER PUBLICATIONS

WO 2011/147450 A1.*

* cited by examiner

*Primary Examiner* — Ankur Jain

(57) ABSTRACT

A method and mechanism to reduce the energy consumption of a single-carrier wireless transmission system such as a base station or a subnet of multiple base stations in relation to the loading of the system. Energy savings may be achieved by withholding the transmission of the system over some time slots, decreasing the available frequencies for user traffic transmission, dynamically adjusting the system to a lower bandwidth, or a combination of these techniques in proportion to the system transmission load at a given time. The lower the system load, the more transmission resources may be withheld or reduced, and, hence, the more savings in energy consumption. Energy savings may be most prominent during periods of low traffic loading of the single carrier-based wireless transmission system.

10 Claims, 7 Drawing Sheets

METHOD AND MECHANISM FOR CONSERVING POWER CONSUMPTION OF SINGLE-CARRIER WIRELESS TRANSMISSION SYSTEMS

CROSS-REFERENCE TO RELATED APPLICATIONS

This application claims the priority benefit under 35 U.S.C. §119(e) of U.S. Provisional Application No. 61/590,392 filed on Jan. 25, 2012, the disclosure of which is incorporated herein by reference in its entirety.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

TECHNICAL FIELD

The present invention relates to conserving power consumption in wireless transmission systems. More particularly, and not by way of limitation, particular embodiments of the present invention are directed to a system and method that conserves power consumption in a Base Station (BS) of a single-carrier wireless transmission system by varying, in proportion to the loading of the BS, the amount of a Radio Frequency (RF) transmission resource available to the BS for Downlink (DL) transmissions.

BACKGROUND

Modern cellular wireless systems consist of numerous subnets that are interconnected into one or more core networks. Each subnet may correspond, approximately, to a city or another geographic region, and may contain several thousands of cells—each of which may be equipped with one or more Base Stations (BS) (also interchangeably referred to herein as Base Transceiver Stations (BTS)). FIG. 1 is a simplified illustration of an exemplary cellular wireless system 10 with two subnets 12, 14. It is understood that, in practice, there may be many more such subnets and system-specific communication elements (e.g., gateways, routers, switching units, etc.) in the wireless system 10 than those shown in FIG. 1. Each subnet 12, 14 may contain multiple cells and cell-specific one or more BS's/BTS's. In FIG. 1, for the sake of clarity, only some of such cells (e.g., cells 16-19 in subnet 12 and cells 20-24 in subnet 14) and BS's (e.g., BS's 26-29 in subnet 12 and BS's 30-34 in subnet 14) are identified by reference numerals. For the sake of illustration, the geographical "boundary" between subnets 12, 14 is identified by reference numeral "35" in FIG. 1. The base stations or BTS's in a subnet may be collectively controlled by a gateway or control node (such as, for example, the gateway/control node 36 controlling all BTS's in the subnet 12 and the gateway/control node 38 controlling all BTS's in the subnet 14 as shown in FIG. 1). Such gateway/control node of a subnet may function as an aggregator of traffic (originating from or going to the corresponding subnet) and support mobility within the wireless network or system 10. In FIG. 1, each subnet-specific gateway/control node 36, 38 is shown to be connected to a core network 40 of the wireless system 10, thereby providing interconnection between subnets 12, 14 so as to facilitate mobility, customer account management, and seamless access to external networks (e.g., the Internet) (not shown) for User Equipments (UEs) (not shown) operating within each subnet.

The primary function of a BS/BTS (e.g., any of the base stations shown in FIG. 1) is to transmit RF signals in the form of electromagnetic energy over a frequency spectrum (e.g., 20 MHz) to a UE under the RF coverage of the BS within the corresponding cell. In a large wireless network, each transmitter (in a BS/BTS) (not shown) consumes some amount of electrical energy, and, in the aggregate, all such transmitters (of base stations in multiple subnets in a wireless network) may consume significant electrical power. Hence, electrical power consumption becomes a significant part of a wireless operator's Operational Expense (OpEx). Magnified across a nationwide network, conservation of power consumption—even at moderate levels at each cell site—can have a significant and measurable impact on the operator's OpEx.

Overall, power consumption has not been traditionally an emphasis of the advances in wireless technology. Efforts to invest in power saving methods and techniques within the standards-setting bodies had been quite recent. For example, the more recently established specifications-developing body Third Generation Partnership Project 2 (3GPP2) has finally attempted to address such power consumption issues in more detail. In any event, it is observed that, in normal operations, electrical power consumption in a wireless system is positively proportional to the amount of data that the wireless system transmits (using its base stations).

FIG. 2 is an exemplary block diagram of logical processing units of a Base Station (BS) 42 in a Multi-Carrier Power Amplifier (MCPA) system such as, for example, a narrowband Code Division Multiple Access (CDMA) system. For ease of illustration, only two such carriers (referred to as "carrier 1" and "carrier 2" in FIG. 2) and associated Transmit/Receive (Tx/Rx) chains 44-45 are shown in the multi-carrier configuration of FIG. 2. However, it is understood that many more such carriers and corresponding carrier-specific Tx/Rx chains may be present in the base station 42. Furthermore, the ovals representing Tx/Rx chains 44-45 are for illustration only, and they do not form part of any signal flow or circuit component in the BS 42. Referring again to FIG. 2, after carrier-specific initial signal processing (e.g., coding, modulation, etc.) at blocks 47-48, each carrier-specific Downlink (DL) signal (i.e., transmissions from the BS 42 to one or more UEs (not shown) in the MCPA system) may be transmitted via one or more BS antennas 50 using a corresponding Tx chain (i.e., Tx portions of the Tx/Rx chains 44-45) that may include a respective Analog-to-Digital Converter (ADC) 50-51, a respective Power Amplifier (PA) 53-54, and a respective duplexer unit 56-57. Signals received by the antenna 50 (i.e., Uplink (UL) signals from one or more UEs in the MCPA system) may be initially processed by each carrier-specific Rx chain (i.e., Rx portions of the Tx/Rx chains 44-45) that may include the respective duplexer 56-57, a respective Low Noise Amplifier (LNA) 59-60, and a respective Digital-to-Analog Converter (DAC) 62-63. The received UL analog signals at the outputs of DAC units 62-63 may be then processed (e.g., demodulated, decoded, etc.) using corresponding carrier-specific signal processing blocks 47-48 as shown in FIG. 2.

U.S. Pat. No. 6,584,330 (hereafter, "the '330 patent") to Tauno Ruuska and assigned to the same assignee as that of the present application describes a method and mechanism for reducing power consumption in an MCPA system. In the '330 patent, a larger spectrum of the wireless system is sub-divided into carrier frequencies $F_1, F_2, \ldots, F_n$. Each carrier has its own transmission (Tx) and receive (Rx) chain (as shown, for example, in FIG. 2 in the context of a two carrier-based MCPA system), and forms a subsystem independently. Usually, when the loading of the system—as defined by the demand on the system (i.e., for example, an MCPA-based base station such as the BS 42 in FIG. 2) to transmit user data in DL (or to enable transmission of user data in UL)—is the highest, every carrier (from carriers $F_1, F_2, \ldots, F_n$) is fully occupied, and therefore transmitting. However, as per the '330 patent, when the system loading is lower, one or more of the carriers can be shut down. FIG. 3 illustrates such shutting down of one or more carriers in an MCPA system during off-peak hours. As shown in FIG. 3, during peak hour traffic, all carriers (over the entire system-wide frequency spectrum 65) may be used for transmissions by the MCPA-based BS (e.g., the BS 42), but, during idle or off-peak hours, one or more carriers can be shut down. Such shut-down carriers and associated frequency spectra are shown by hatched portions and collectively identified by reference numeral 67 in FIG. 3. Carrier 1 in FIG. 3 (or carrier 1 in the context of FIG. 2) may be the "primary" carrier and can always remain turned on—i.e., its Power Amplifier (PA) and transmission/reception circuitry (in the corresponding Tx/Rx chain, such as the Tx/Rx chain 44 in FIG. 2) can continue to transmit (and receive). However, carrier 2 and other carriers in FIG. 3 (or carrier 2 in the context of FIG. 2) are "additional" carriers and can be turned off to preserve power consumption. (In the context of FIG. 2, dotted arrows are shown for uplink and downlink communications on carrier 2 to indicate that this carrier can be turned off, if desired.) When a carrier is "turned off" (i.e., when the system or BS 42 is not transmitting or receiving on that carrier), associated Power Amplifier (PA) for that carrier and carrier-specific transmission/reception circuitry (e.g., in the corresponding Tx/Rx chain) can be powered off in order to save energy consumption.

SUMMARY

The above-described method of shutting-down carriers in an MCPA system to conserve the BS power consumption is ill-suited to a single-carrier single subsystem, where there is a single Tx/Rx chain over the full frequency spectrum. In contrast to the multi-carrier configuration of FIG. 2, FIG. 4 is an exemplary block diagram of logical processing units of a BS 68 that is operating in a single-carrier configuration. As shown in FIG. 4, the single-carrier configuration may employ a single Power Amplifier (PA) 70 and a single Transmit/Receive (Tx/Rx) chain 72 to transmit and receive RF signals using one or more sub-carriers that are available to the BS 68 over the entire frequency spectrum associated with the BS 68 in the corresponding wireless system (like the frequency spectrum 65 shown in FIG. 3 in the context of discussion of power saving in the BS 42 in FIG. 2). As in case of FIG. 2, the oval representing the Tx/Rx chain 72 is for illustration only, and it does not form part of any signal flow or circuit component in the BS 68. In the single-carrier configuration shown in FIG. 4, downlink (DL) transmissions on each of the subcarriers 1 and 2 may initially receive subcarrier-specific signal processing (e.g., coding, modulation, etc.) at blocks 74-75. However, contrary to the multi-carrier arrangement in FIG. 2, in the single-carrier configuration of FIG. 4, after such initial signal processing, the component subcarriers may be combined into a single carrier using Inverse Fast Fourier Transform (IFFT) at block 77. This single carrier is then transmitted through the antenna 78 using a single ADC 78, a single PA 70, and a duplexer 82 in the Tx portion of the Tx/Rx chain 72. Similarly, in the uplink (UL), a single carrier is received at the antenna 78 and throughout the Tx/Rx chain 72 (via the Rx portion of the Tx/Rx chain including the duplexer 82, a single LNA 83, and a single DAC 84). In the uplink, this received single carrier is then "decomposed" into its component subcarriers using Fast Fourier Transform (FFT) at block 77, and then subcarrier-specific signal processing (e.g., demodulation, decoding, etc.) is applied at blocks 74-75 to retrieve the content received via UL receptions.

It is seen from the above discussion of FIG. 4 that the method described in the '330 patent is ill-suited in case of a single-carrier configuration where only a single Tx/Rx chain (as well as a single PA) is used for all subcarriers that are available to a BS to transmit/receive over the supported frequency spectrum. Hence, any shutting-down of such common PA to conserve power would completely shutdown all DL transmissions from the BS 68. In other words, there is no partial or selective, subcarrier-specific shutting down as per the '330 patent is possible in case of a single-carrier based transmission/reception configuration.

In view of wide usage of single-carrier configurations in base stations performing wireless transmissions using traditional Frequency Division Multiple Access (FDMA), Time Division Multiple Access (TDMA), Code Division Multiple Access (CDMA), or Orthogonal Frequency Division Multiple Access (OFDMA) technologies, it is desirable to provide a mechanism and method that can conserve power consumption in such single-carrier wireless systems. It is also desirable to accomplish this power conservation without significant hardware changes either to the base station (which is operating in the single-carrier configuration) or to any of the UE's with which the base station is communicating.

Particular embodiments disclosed herein provide a solution to the above-mentioned problem of conserving power consumption in single-carrier wireless transmission systems (or base stations). Disclosed methods and mechanisms reduce the energy consumption of a wireless transmission system (or BS) in relation to the loading of the system (or BS). When loading of a single-carrier wireless transmission system or BS (including the PA) is lower, power may be conserved by throttling down the size of the supported frequency spectrum (also referred to herein as "System Bandwidth Scaling"), withholding transmission over part of the available spectrum (also referred to herein as "Scheduling Bandwidth Scaling"), or shutting down transmission over part of the time segments (also referred to herein as "System Duty-Cycle Scaling").

In one embodiment, System Bandwidth Scaling may be applicable to the scalable Frequency Division Multiplexing (FDM) wireless systems, where the wireless system is automatically scaled to a system with a smaller (or larger) frequency bandwidth for the carrier for a smaller (or larger) system loading. For example, in case of the 20 MHz scalable OFDMA system such as a Third Generation Partnership Project (3GPP) Long Term Evolution (LTE) system, when the system loading is at the minimum, the system can be scaled down to a carrier having only 1.4 MHz frequency bandwidth. With a reduced frequency spectrum, the power output of the system is proportionally reduced.

In another embodiment, Scheduling Bandwidth Scaling (in which transmission over some frequencies may be ceased) may be applicable to an FDM wireless system as well, where the wireless system ceases transmission over a smaller (or larger) frequency range of the carrier in proportion to the higher (or lower) loading of the system. This also results in a smaller frequency spectrum that the PA has to cover, and thus leading to reduced power consumption.

As a variation to the embodiment in which Scheduling Bandwidth Scaling is employed, a further embodiment, referred to herein as "Scheduling Bandwidth Scaling without Gating Reference and Auxiliary Channels", does not shutdown the references and auxiliary symbols (in contrast to the Scheduling Bandwidth Scaling aspect mentioned above), but only schedules within the restricted bandwidth. This may result in the preferred power reduction while maintaining the same level of power density. In a refined version of this embodiment, a sliding "window" may be employed which can slide across the full spectrum to retain a level of frequency diversity under software control (otherwise there may be some loss of frequency diversity).

In yet another embodiment, System Duty-Cycle Scaling may be applicable to a Time Division Multiplexing (TDM) wireless system, where the wireless system subdivides the RF transmission into time segments. By ceasing more (or less) transmission in time slots across the full or part of the frequency spectrum in proportion to the lower (or higher) loading of the system, the power consumption of the PA can be conserved.

In one embodiment, a method is disclosed for controlling power consumption of a BS that is part of a wireless system and configured to provide RF coverage over a geographical region associated therewith in the wireless system. The method comprises performing the following steps using the BS: (i) determining the transmission load of the BS for transmitting DL RF signals to one or more UEs in the wireless system within the RF coverage of the BS, wherein the BS is operating in a single-carrier configuration that employs a single Power Amplifier (PA) and a single Tx/Rx chain to transmit and receive RF signals using one or more sub-carriers that are available to the BS over the entire frequency spectrum associated with the BS in the wireless system; and (ii) in proportion to the loading of the BS, varying the amount of an RF transmission resource available to the BS for DL transmissions and to the one or more UEs for UL transmissions to the BS.

In another embodiment, a method is disclosed for operating a BS that is part of a wireless system and configured to provide RF coverage over a geographical region associated therewith in the wireless system. The method comprises the steps of: (i) determining transmission load of the BS for transmitting DL RF signals to one or more UEs in the wireless system within the RF coverage of the BS, wherein the BS is operating in a single-carrier configuration that employs a single PA and a single Tx/Rx chain to transmit and receive RF signals using one or more subcarriers that are available to the BS over the entire frequency spectrum associated with the BS in the wireless system; and (ii) in proportion to the loading of the BS, varying the amount of an RF transmission resource available to the BS for DL transmissions and shared with the one or more UEs for UL transmissions to the BS.

In another embodiment, a BS is disclosed that is part of a wireless system and configured to perform the following: (i) provide RF coverage over a geographical region associated with the BS in the wireless system; (ii) determine the transmission load of the BS for transmitting DL RF signals to one or more UEs in the wireless system within the RF coverage of the BS, wherein the BS is operating in a single-carrier configuration that employs a single PA and a single Transmit/Receive Tx/Rx chain to transmit and receive RF signals using one or more subcarriers that are available to the BS over the entire frequency spectrum associated with the BS in the wireless system; and (iii) in proportion to the loading of the BS, vary the amount of an RF transmission resource available to the BS for DL transmissions and to the one or more UEs for UL transmissions to the BS.

In yet another embodiment, a wireless system is disclosed that comprises a BS; and a UE that is in communication with the BS. In the wireless system, the BS is configured to perform the following: (i) provide RF coverage over a geographical region associated with the BS in the wireless system; (ii) determine the transmission load of the BS for transmitting DL RF signals to the UE in the wireless system within the RF coverage of the BS, wherein the BS is operating in a single-carrier configuration that employs a single PA and a single Tx/Rx chain to transmit and receive RF signals using one or more subcarriers that are available to the BS over the entire frequency spectrum associated with the BS in the wireless system; (iii) in proportion to the loading of the BS, vary the amount of an RF transmission resource available to the BS for DL transmissions and to the UE for UL transmissions to the BS; and (iv) using a DL signal, inform the UE of the most-recent available amount of the RF transmission resource. In the wireless system, the UE is configured to perform the following: (i) receive and process the DL signal from the BS informing the UE of the most-recent available amount of the RF transmission resource, and (ii) commence the UL transmissions to the BS using the most-recent available amount of the RF transmission resource.

In still another embodiment, a UE is disclosed that is within an RF coverage of a BS in a wireless system and in communication with the BS to receive DL transmissions therefrom, wherein the BS is operating in a single-carrier configuration that employs a single PA and a single Tx/Rx chain to transmit and receive RF signals using one or more subcarriers that are available to the BS over the entire frequency spectrum associated with the BS in the wireless system. The UE is configured to receive a DL signal from the BS informing the UE of the most-recent amount of an RF transmission resource available to the UE for UL transmissions to the BS, wherein the most-recent amount of the RF transmission resource is determined based on the loading of the BS, and wherein the RF transmission resource is one of the following: (i) a system-wide frequency bandwidth available to the BS for DL transmissions and to the UE for UL transmissions, (ii) the one or more subcarriers and corresponding subcarrier-specific frequency range that are available to the BS and to the UE within the system-wide frequency bandwidth to perform respective DL and UL transmissions, and (iii) a series of time segments allocated by the BS for DL and UL transmissions in the wireless system at a specific subcarrier frequency. The UE is also configured to process the received DL signal, and commence the UL transmissions to the BS using the most-recent available amount of the RF transmission resource.

Particular embodiments thus provide energy savings in a single-carrier based transmission configuration (in a wireless system or BS) by withholding the transmission of the system over some time slots, decreasing the available frequencies for user traffic transmission, dynamically adjusting the system to a lower bandwidth, or a combination of these aspects, in proportion to the system transmission load at a given time. The lower the system load, the more transmission resources may be withheld or reduced, and, hence, the more savings in energy consumption. Energy savings may be most prominent during non-busy hours (e.g., mid-night to early morning) of the single carrier-based wireless transmission system.

BRIEF DESCRIPTION OF THE DRAWINGS

In the following section, the invention will be described with reference to exemplary embodiments illustrated in the figures, in which.

DETAILED DESCRIPTION

Figure 1:
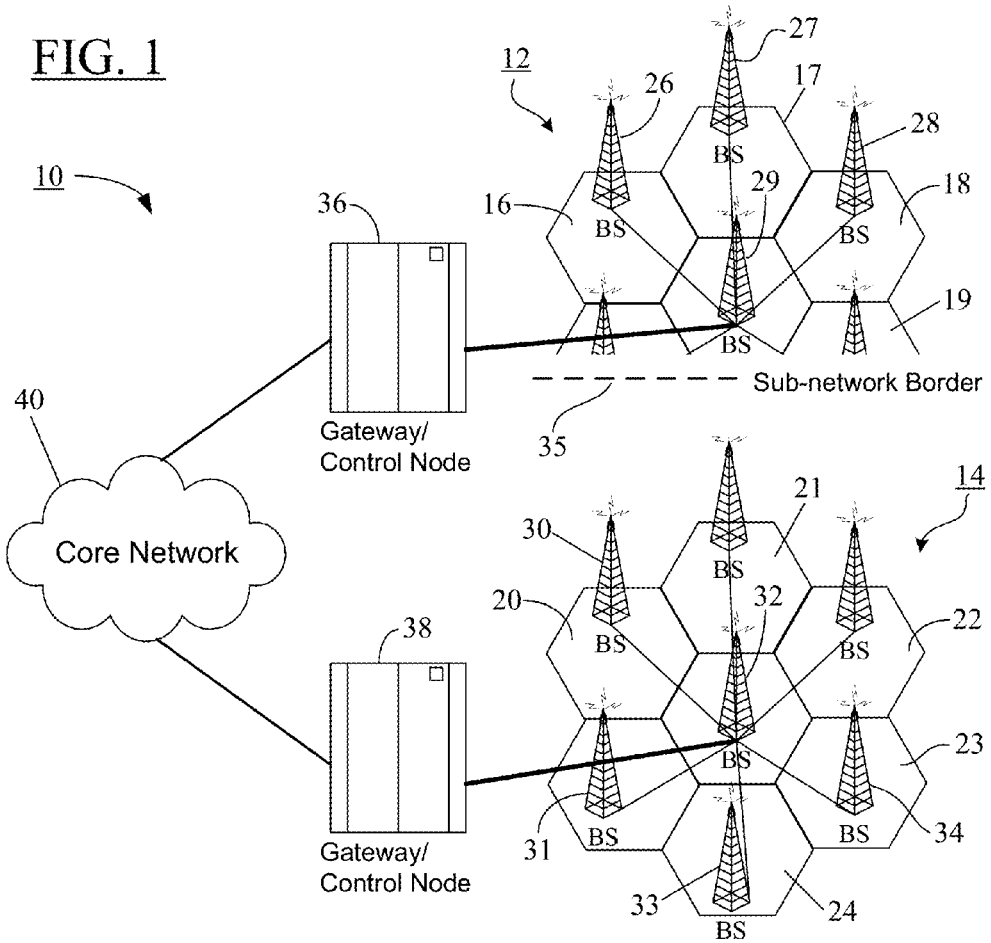
FIG. 1 is a simplified illustration of an exemplary cellular wireless system with two subnets.
Figure 2:
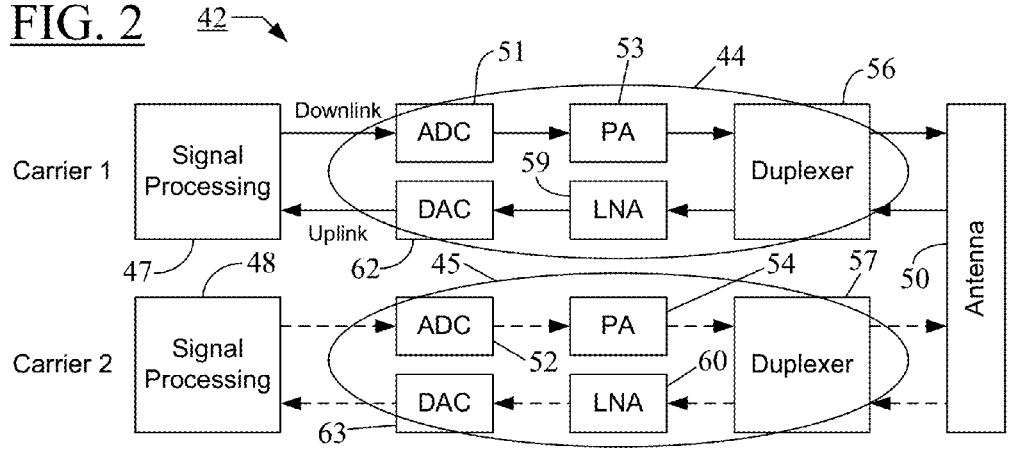
FIG. 2 is an exemplary block diagram of logical processing units of a Base Station (BS) in a Multi-Carrier Power Amplifier (MCPA) system.
Figure 3:
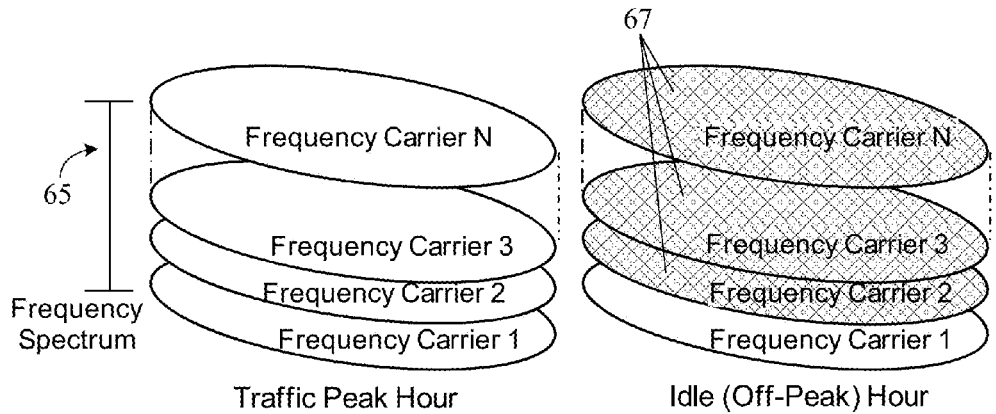
FIG. 3 illustrates shutting down of one or more carriers in an MCPA system during off-peak hours.

In the following detailed description, numerous specific details are set forth in order to provide a thorough understanding of the invention. However, the present invention may be practiced without these specific details. In other instances, well-known methods, procedures, components and circuits have not been described in detail so as not to obscure the present invention. Additionally, it should be understood that although the disclosed solutions are described primarily in the context of a cellular telephone/data network, the disclosed solutions can be implemented in other forms of cellular or non-cellular wireless networks as well (for example, a corporate-wide wireless data network, a point-to-point wireless communication network such as a proprietary wireless walkie-talkie network, a satellite communication network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "pre-determined," "single-carrier," etc.) may be occasionally interchangeably used with its non-hyphenated version (e.g., "predetermined," "single carrier," etc.), a capitalized entry (e.g., "Uplink") may be interchangeably used with its non-capitalized version (e.g., "uplink"), an italicized term (e.g., "F", "n") may be interchangeably used with its non-italicized version (e.g., "F", "n"), and plural terms may be indicated with or without an apostrophe (e.g., UE's or UEs, BS's or BSs). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to/from the second entity regardless of the type (analog or digital) of those signals. It is further noted that various figures (including component diagrams) shown and discussed herein are for illustrative purpose only, and are not drawn to scale.

Figure 5:
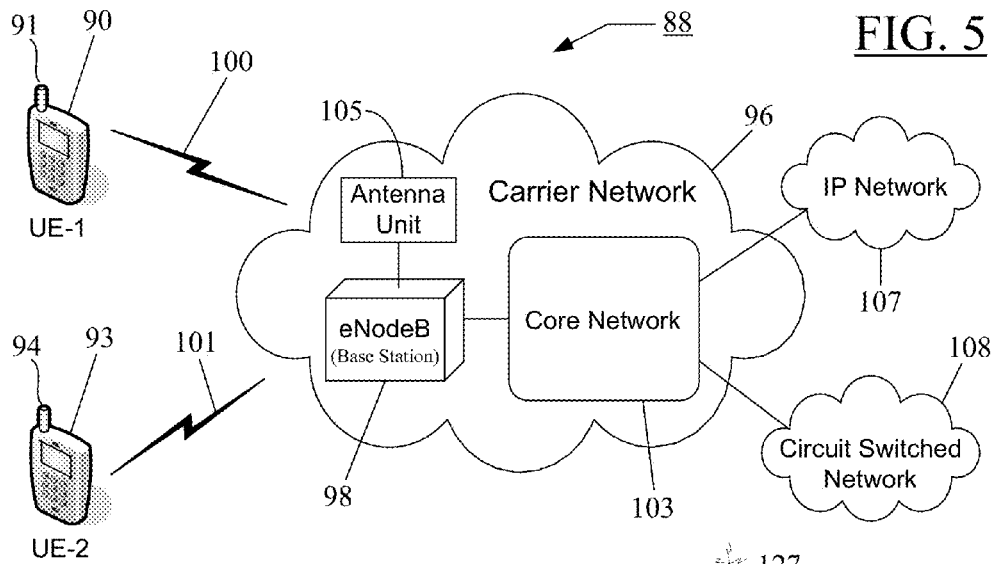
FIG. 5 is a diagram of an exemplary single-carrier wireless system in which power conservation according to the teachings of one embodiment of the present invention may be implemented.

FIG. 5 is a diagram of an exemplary single-carrier wireless system 88 in which power conservation according to the teachings of one embodiment of the present invention may be implemented. The system 10 may include a plurality of mobile handsets; two of which are shown in FIG. 5 and identified by reference numerals 90 and 93. Each mobile handset 90, 93 may include a corresponding antenna unit 91, 94. The mobile handsets 90, 93 are shown to be in wireless communication with a carrier network 96 of a wireless service provider (or operator) through a wireless access (or communication) node 98 of the carrier network 96. The access node 98 may be, for example, a base station (BS) in a Third Generation (3G) network, or an evolved Node-B (eNodeB) or Home eNodeB (HeNB) when the carrier network 96 is a Long-Term Evolution (LTE) network, or any other home base station or femtocell, and may provide radio interface to the mobile handsets 90, 93. In other embodiments, the communication node 98 may also include a site controller, an access point (AP), a radio tower, or any other type of radio interface device capable of operating in a wireless environment. It is noted here that the terms "mobile handset," "wireless handset," "wireless device," "terminal," and "user equipment (UE)" may be used interchangeably herein to refer to a wireless communication device that is capable of voice and/or data communication via a wireless carrier network. Some examples of such mobile handsets/devices include cellular telephones or data transfer equipments (e.g., a Personal Digital Assistant (PDA) or a pager), smartphones (e.g., iPhone™, Android™, Blackberry™ etc.), computers, Bluetooth® devices, or any other type of user devices capable of operating in a wireless environment. Similarly, the terms "wireless network" or "carrier network" may be used interchangeably herein to refer to a wireless communication network (e.g., a cellular network) facilitating voice and/or data communication between two user equipments (UEs).

In the wireless system of FIG. 5, the BS or eNodeB 98 may be operating in a single-carrier configuration (like the BS 68 discussed earlier with reference to FIG. 4) and may be configured to implement the steps outlined in the flowchart in FIG. 7 (which is discussed later below). In addition to providing air interface or communication channel (e.g., as represented by wireless links 100-101 in FIG. 5) to the UEs 90, 93 via an antenna unit 105, the access node 98 may also perform radio resource management (as, for example, in case of an eNodeB or HeNB in an LTE system) using, for example, channel feedbacks received from the UEs 90, 93 operating in the network 96. The communication channel (e.g., a Radio Frequency (RF) channel) between the base station and the wireless terminals may provide a conduit for the signals exchanged between the base station 98 and UEs 90, 93. The eNB antenna unit 105 may include two or more antennas (not shown individually) to support simultaneous multiple transmissions/receptions of signals to/from multiple UEs 90, 93.

Although various examples in the discussion below are provided primarily in the context of an LTE network, the disclosed solutions may equally apply, with suitable modifications (as may be apparent to one skilled in the art using the present teachings), to a number of different FDM and TDM based wireless systems or networks (as well as Frequency Division Duplex (FDD) and Time Division Duplex (TDD) wireless systems/networks) that may be operating in single-carrier configuration. Such networks or systems may include, for example, standard-based systems/networks using Second Generation (2G), 3G, or Fourth Generation (4G) specifications, or non-standard based systems. Some examples of such systems or networks include, but not limited to, Global System for Mobile communications (GSM) networks, Telecommunications Industry Association/Electronic Industries Alliance (TIA/EIA) Interim Standard-136 (IS-136) based TDMA systems, Wideband Code Division Multiple Access (WCDMA) systems, 3GPP LTE networks, WCDMA-based High Speed Packet Access (HSPA) systems, 3GPP2's CDMA based High Rate Packet Data (HRPD) systems, CDMA2000 or TIA/EIA IS-2000 systems, Evolution-Data Optimized (EV-DO) systems, Worldwide Interoperability for Microwave Access (WiMAX) systems based on Institute of Electrical and Electronics Engineers (IEEE) standard IEEE 802.16e, International Mobile Telecommunications-Advanced (IMT-Advanced) systems (e.g., LTE Advanced systems), other Universal Terrestrial Radio Access Networks (UTRAN) or Evolved-UTRAN (E-UTRAN) networks, GSM/Enhanced Data Rate for GSM Evolution (GSM/EDGE) systems, a non-standard based proprietary corporate wireless network, etc.

Referring again to FIG. 5, in case of a 3G carrier network 96, the communication node 98 may include functionalities of a 3G base station along with some or all functionalities of a 3G Radio Network Controller (RNC), and may be configured to provide power conservation as discussed hereinbelow. Communication nodes in other types of carrier networks (e.g., 2G networks, or 4G networks and beyond) also may be configured similarly. In one embodiment, the node 98 may be configured (in hardware, via software, or both) to implement power conservation as per the disclosed solutions. For example, when existing hardware architecture of the access node 98 cannot be modified, the power conservation methodology according to one embodiment of the present invention may be implemented through suitable programming of one or more processors (e.g., processor 197 (or, more particularly, processing unit 204) in FIG. 12) in the access node 98 or a Base Station Controller (BSC) (if available). The execution of the program code (by a processor in the node 98) may cause the processor to perform power conservation in proportion to the loading of the BS as discussed herein. Similarly, one or more of the UE's 90, 93 may be suitably configured (in hardware and/or software) to enable the UE to "understand" message(s) received from its BS when that BS is implementing power conservation as per the disclosed solutions. In one embodiment, the eNB 98 may include a BS loading determination module and one or more of the UEs 90, 93 may include a BS power conservation support module as part of their processing units (as shown by way of examples in FIGS. 11 and 12 and discussed later hereinbelow). These modules (preferably implemented in software) may be configured to power conservation related mechanisms discussed later below. Thus, in the discussion below, although a communication unit—whether the communication node 98 (or its BSC) or any of the UEs 90, 93—may be referred to as "performing," "accomplishing," or "carrying out" a function or process, it is evident to one skilled in the art that such performance may be technically accomplished in hardware and/or software as desired.

The carrier network 96 may include a core network 103 coupled to the communication node 98 and providing logical and control functions (e.g., subscriber account management, billing, subscriber mobility management, etc.) in the network 96. In case of an LTE carrier network, the core network 103 may be an Access Gateway (AGW) or may function in conjunction with a subnet-specific gateway/control node (not shown in FIG. 5, but discussed later in the context of the configuration in FIG. 6). Regardless of the type of carrier network 96, the core network 103 may function to provide connection of one or more of the UEs 90, 93 to other mobile handsets operating in the carrier network 96 and also to other communication devices (e.g., wireline or wireless phones) or resources (e.g., an Internet website) in other voice and/or data networks external to the carrier network 96. In that regard, the core network 103 may be coupled to a packet-switched network 107 (e.g., an Internet Protocol (IP) network such as the Internet) as well as a circuit-switched network 108 such as the Public-Switched Telephone Network (PSTN) to accomplish the desired connections beyond the devices operating in the carrier network 96. Thus, through the communication node's 98 connection to the core network 103 and a handset's radio link with the communication node 98, a user of the handset (e.g., UE 90 or 93) may wirelessly (and seamlessly) access many different resources or systems beyond those operating within the carrier network 96 of an operator.

As is understood, the carrier network 96 may be a cellular telephone network or a Public Land Mobile Network (PLMN) in which the UE's 90, 93 may be subscriber units. However, as mentioned before, the present invention is operable in other non-cellular wireless networks as well (whether voice networks, data networks, or both). Furthermore, portions of the carrier network 96 may include, independently or in combination, any of the present or future wireline or wireless communication networks such as, for example, the PSTN, an IP Multimedia Subsystem (IMS) based network, or a satellite-based communication link. Similarly, as also mentioned above, the carrier network 96 may be connected to the Internet via its core network's 103 connection to the IP (packet-switched) network 107 or may include a portion of the Internet as part thereof. In one embodiment, a network may include more or less or different type of functional entities than those shown in the context of carrier network 96 in FIG. 5.

Figure 6:
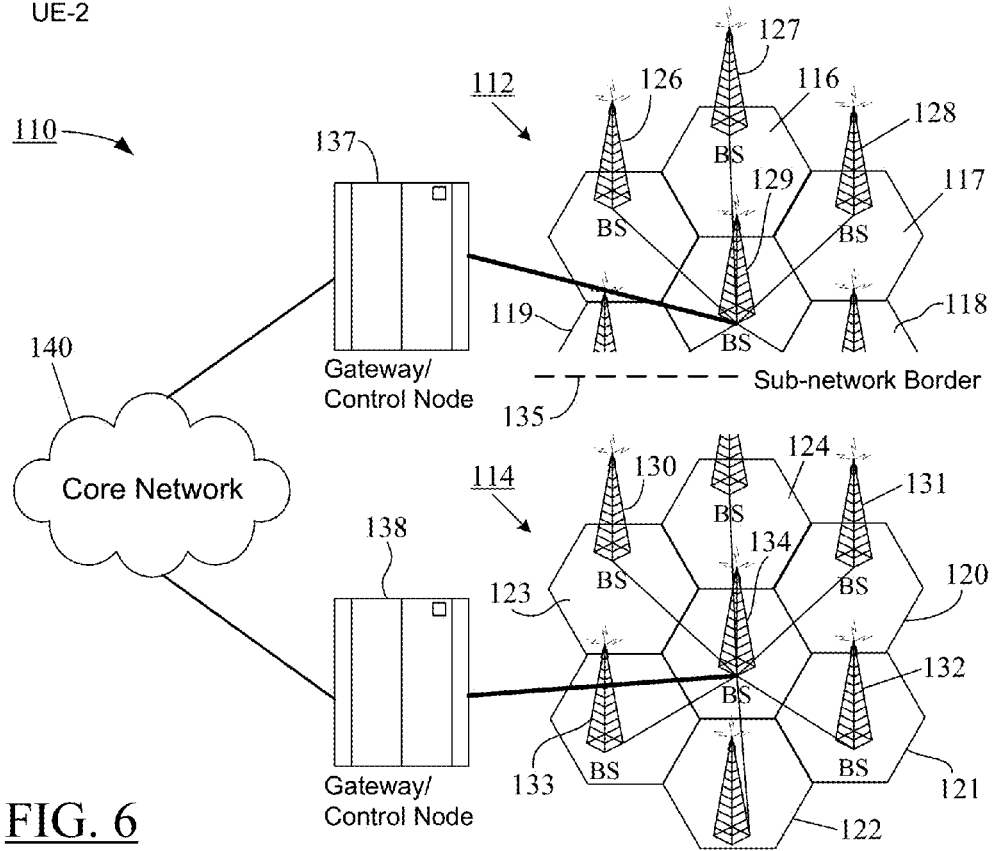
FIG. 6 is a simplified illustration of an exemplary cellular wireless system with two subnets, each having multiple base stations operating in single-carrier configuration, wherein system-wide power conservation across multiple base stations may be accomplished using the teachings of one embodiment of the present invention.

FIG. 6 is a simplified illustration of an exemplary cellular wireless system 110 with two subnets 112, 114, each having multiple base stations operating in single-carrier configuration (like the one discussed earlier with reference to FIG. 4), wherein system-wide power conservation across multiple base stations may be accomplished using the teachings of one embodiment of the present invention. Because of structural similarity between the cellular system configurations in FIGS. 1 and 6, a detailed discussion of the architecture in FIG. 6 is not provided herein for the sake of brevity. It is noted, however, that, like the cellular system 10 in FIG. 1, the cellular system 110 in FIG. 6 may also include more than two subnets and corresponding additional gateway/control nodes, more or less base stations per subnet than those shown in FIG. 6, and many other system-specific communication elements (e.g., gateways, routers, switching units, etc.) than those shown in FIG. 6. Each subnet 112, 114 may contain multiple cells and one or more BS's/BTS's associated with the corresponding cells. In FIG. 6, for the sake of clarity, only some of such cells (e.g., cells 116-119 in subnet 112 and cells 120-124 in subnet 114) and BS's (e.g., BS's 126-129 in subnet 112 and BS's 130-134 in subnet 114) are identified by reference numerals. For the sake of illustration, the geographical "boundary" between subnets 112, 114 is identified by reference numeral "135" in FIG. 6. In one embodiment, one or more of the BS's in FIG. 6 may be similar to the eNB 98 in FIG. 5 and may be similarly configured to implement power conservation (as discussed below) while operating in the single-carrier configuration. As in case of FIG. 1, the BS's in each subnet 112, 114 in FIG. 6 may be collectively controlled by a respective gateway/control node 137, 138, which, in turn, may be connected to a core network 140 (which, in one embodiment, may be similar to the core network 103 discussed before with reference to FIG. 5), thereby providing interconnection between subnets 112, 114.

In one embodiment, one or more of the base stations in subnets 112, 114 may be configured to implement a subnet-specific intra-cell or inter-cell Coordinated Multi-Point (CoMP) transmission/reception arrangement. As part of such CoMP arrangement, in one embodiment, the respective control node 137, 138 may provide the desired CoMP coordination among the base stations operating in the CoMP arrangement. In that regard, such base stations may be collectively treated as a single base station (which can be referred to as a "super base station") by the respective control node 137, 138. Power conservation according to the present invention, however, may be implemented at each BS individually and coordinated among all constituent base stations of a "super base station". In one embodiment, one or more of the BS's operating in a CoMP arrangement in the system 110 may have geographically-distributed antennas. Thus, some or all of the antennas of such "distributed" BS may not be co-located at a single physical location, but rather may be geographically distributed at different locations within the respective cell site. The distributed antennas may be connected to and controlled by a central computing facility (not shown) within the associated BS itself (which may be implementing power conservation in the manner discussed below). Such BS also may be considered a "super base station" with antenna distributed in various geographical areas.

In one embodiment, although power conservation (as discussed below) may be locally implemented at each base station (which may or may not be a "super base station") in the system 110, such power conservation may be coordinated system-wide (i.e., across all subnets in the system 110) using either the control nodes 137-138 or the core network 140 or all of them. The control nodes 137-138 and/or the core network 140 (as the case may be) may be suitably configured to coordinate such system-wide power conservation among all single-carrier based transmitting entities—i.e., BS's—in the system 110.

It is observed here that various embodiments disclosed herein may be primarily applied to conserve power during DL transmissions or UL scheduling-related transmissions in a power transmitting entity operating in a single-carrier configuration (whether in a 2G/3G/4G cellular network or in a non-cellular network such as a proprietary walkie-talkie system)—i.e., a BS or an eNB, or a "super base station" (which may include multiple base stations or a single base station with geographically-distributed antennas as discussed above) operating in a CoMP arrangement, or any other entity having BS-type functionality (e.g., as a wireless access node or access point). Therefore, although the term "wireless transmission system" (or, more simply, "wireless system" or a similar such term) may technically embrace entities, components, or elements in addition to base stations (e.g., the wireless systems 88 and 110 discussed earlier with reference to FIGS. 5 and 6, respectively), it is understood that, in the single-carrier based discussion herein, such term primarily relates to a base station/eNB (or an entity having functionality of a base station) operating in a single-carrier configuration. Therefore, although a strict interpretation of the term "wireless transmission system" may not allow it to be interchangeably used with the term "base station," in the discussion herein (for the sake of simplicity and ease of reference), these terms may be occasionally used interchangeably—in proper context—to denote primacy of power conservation at a single-carrier base station according to particular embodiments of the present invention. When context dictates otherwise, these terms may retain their separate meanings. Thus, for example, depending on the context, the term "single-carrier wireless transmission system" may either refer to an individual BS that is operating in the single-carrier configuration in a wireless network (even though there may be additional system elements supporting such BS to function in the single-carrier mode) or, in the context of a system-wide implementation, this term may refer to a wireless system having multiple BS's where one or more of these BS's are operating in the single-carrier configuration.

Figure 7:
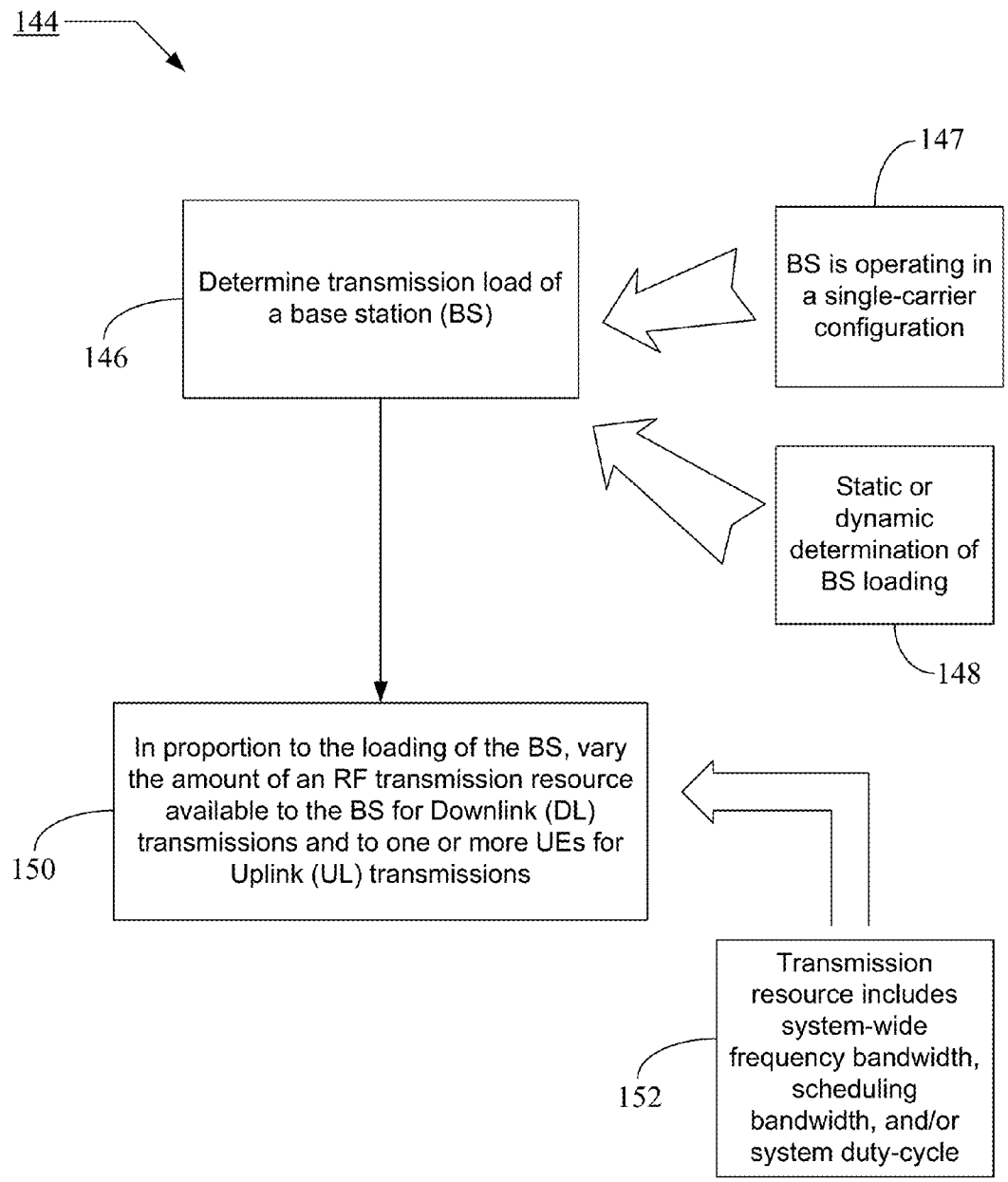
FIG. 7 depicts an exemplary flowchart to provide power conservation in a single-carrier wireless transmission system according to one embodiment of the present invention.

FIG. 7 depicts an exemplary flowchart 144 to provide power conservation in a single-carrier wireless transmission system (e.g., the system 88 in FIG. 5 or the system 110 in FIG. 6 where one or more BS's operate in single-carrier configuration, as indicated at block 147) according to one embodiment of the present invention. As discussed earlier with reference to FIG. 4, the single-carrier configuration may employ a single Power Amplifier (PA) and a single Transmit/Receive (Tx/Rx) chain to transmit and receive RF signals using one or more sub-carriers that are available to a BS (e.g., the eNB 98 in FIG. 5, or any one or more of the BS's in FIG. 6, or the BS 195 in FIG. 12) over the entire frequency spectrum associated with the BS in the corresponding wireless system (e.g., the 20 MHz spectrum allotted to a BS in an LTE system). Initially, at block 146, the "loading" or "transmission load" of the BS may be determined. Such determination may be performed by the BS itself (when suitably configured), or by a Base Station Controller (BSC) (not shown), or by any other control unit (whether in a gateway/control node or in a core network) that is in communication with the BS. Herein, the interchangeably-used terms "loading" or "transmission load" refer to the extent of demand on a BS to perform DL transmissions or UL-scheduling related transmissions (e.g., to one or more UE's in the system that are within the geographical region associated with the BS (e.g., a cell or a cell site) and under its RF coverage) using frequency resources (e.g., in case of an FDMA system), time slots (e.g., in case of a TDMA system), and/or coding resources (e.g., in case of a CDMA system). Generally speaking, such "loading" refers to an "average" loading of the BS determined (either statically or dynamically as indicated at block 148 and discussed in more detail later below) over a period of time using, for example, empirical data of BS transmissions, prior BS usage patterns, foreseeable (or even unplanned) BS traffic variations, etc. As indicated at block 150, in proportion to the loading of the BS, the amount of an RF transmission resource—available to the BS for DL transmissions to UE's and to one or more UE's for UL transmissions to the BS—may be varied as discussed in more detail below with reference to FIGS. 8-10. As per block 152, such RF transmission resource may include, for example, system-wide frequency bandwidth (discussed with reference to FIG. 8), scheduling bandwidth (discussed with reference to FIG. 9), and/or system duty-cycle (discussed with reference to FIG. 10). As in case of block 146, the action at block 150 may be performed by the BS itself (when suitably configured), or by a Base Station Controller (BSC) (not shown), or by any other control unit (whether in a gateway/control node or in a core network) that is in communication with the BS.

It is noted here that traditional FDMA (e.g., GSM), TDMA (e.g., IS-136), and OFDMA (e.g., LTE) technologies are FDM systems as well as TDM systems. Furthermore, CDMA wireless technologies (e.g., 3GPP2 CDMA/HRPD, 3GPP W-CDMA/HSPA) are also TDM systems. Hence, because the power conservation discussed herein is applicable to both FDM and TDM based systems (as well as to FDD and TDD systems), it is also applicable to several multiple-access technologies—i.e., OFDMA (e.g., 3GPP LTE, IEEE 802.16e WiMAX), FDMA (e.g., GSM, IS-136), CDMA (e.g., IS2000/HRPD, W-CDMA/HSPA), and TDMA (e.g., 3GPP LTE, W-CDMA/HSPA).

Figure 8:
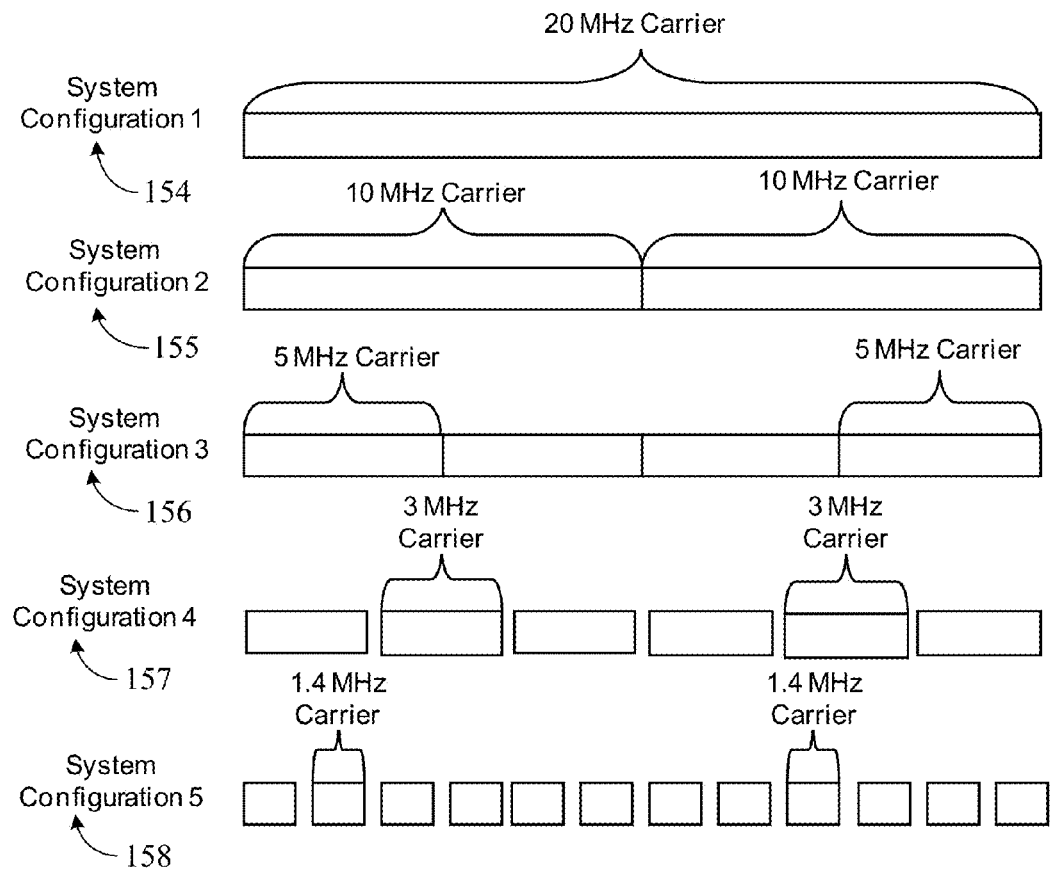
FIG. 8 shows how transmission bandwidth of a single-carrier wireless system may be scaled based on the loading of the system.

FIG. 8 shows how transmission bandwidth of a single-carrier wireless system (e.g., the system 88 in FIG. 5, or system 110 in FIG. 6, or any of the individual BS's (as applicable) shown in FIGS. 5-6) may be scaled based on the loading of the system. In a scalable FDM system such as that for OFDMA related technologies 3GPP2 LTE and IEEE802.16e WiMAX, a full spectrum (or system bandwidth) of 20 MHz can be subdivided into several 10 MHz, 5 MHz, 3 MHz, or 1.4 MHz single-carrier configurations. As shown in FIG. 8, LTE allows a network operator to select at least five different bandwidth configurations (indicated by reference numerals 154 through 158) with different partitions of the full spectrum for cells in its wireless system. Thus, for example, even if a cell in the operator's system functions in a single-carrier configuration (i.e., a configuration similar to that shown in FIG. 4 for the BS associated with the cell), that cell may be assigned the entire 20 MHz bandwidth as its operating bandwidth or just a portion of the total system-wide bandwidth (e.g., 10 MHz, 5 MHz, etc.), depending on design considerations (e.g., neighboring cell interference, area of coverage, cell size, etc.). In one embodiment, this bandwidth-scaling aspect of LTE is used by a BS (or another control unit or an entity in the core network, as mentioned earlier) to scale down the bandwidth allotted to the BS's single-carrier depending on the loading of the BS. For example, even if the entire transmission resource—i.e., system-wide 20 MHz bandwidth—is available to a BS in an LTE system, in one embodiment, the BS may be configured to reduce its operating bandwidth (i.e., the bandwidth of its transmitted carrier) from 20 MHz to 5 MHz based on BS's loading. In other words, the BS's transmission remains single-carrier based, but the bandwidth assigned to such single carrier may be a portion of the total bandwidth (e.g., 20 MHz) available in the system. The single-carrier configuration having the full system bandwidth of 20 MHz may be the most efficient for peak-hour operations (e.g., during day-time business hours) as there may be only a single set of system information to be broadcast cell-wide and thus less overhead (as compared to frequent variations in broadcasts of system information if carrier bandwidth is changed too frequently). Furthermore, during peak hours, operating the full spectrum as a single block does not fragment the frequency and, thus, is more efficient. However, during non-peak hours, due to the much lower loading, this peak hour-based wide bandwidth may no longer be needed.

In general, for any given wireless technology, the Over-The-Air (OTA) DL transmission from a BS may consist of system information broadcast channels (e.g., Master Information Block (MIB) and System Information Block (SIB) in LTE), physical control channels (e.g., for synchronization), reference/pilot channels, and user traffic channels. According to certain embodiments disclosed herein, during peak hours (e.g., during day-time business hours), the OTA transmission may use full power (across the entire system-wide bandwidth) to maximize data transmission rate within the coverage of the cell. However, during off-peak, but other busy hours (e.g., after-business evening hours), some user traffic channels may not be transmitting or transmitting with much reduced power. During non-busy hours (e.g., late night through early morning hours), many more user traffic channels may not be transmitting, and physical control channels may be throttled back, but system broadcast and reference channels may continue to be transmitted while limited user traffic channel transmission is maintained in proportion to the actual need of the supported data rate.

As part of the System Bandwidth Scaling aspect, the wireless system (through suitably-configured BS's in the system, as mentioned earlier) may dynamically (and preferably automatically) scale its transmission bandwidth (DL and/or UL) wider when the loading of the system is higher, and narrower when the loading is lower. For example, in the case of 3GPP LTE, this can be from a maximum of 20 MHz (e.g., the maximum system-wide bandwidth in LTE) for a single carrier, to 10 MHz, 5 MHz, or a minimum of 1.4 MHz (or some similar scalable bandwidth of the specific wireless technology) for a single carrier. In certain periods of the days, typically 12:00 AM-5:30 AM workdays (i.e., late night through early morning hours), when there is no or little user traffic, for example, the system (e.g., each BS in the system) may operate over a single carrier of size 1.4 MHz. There may be some occasional UEs within the system using data traffic at such odd hours, but the majority of the UEs, even though they may be camped on the system, may stay in the idle mode, and, hence, use no transmission resources at all.

It is observed here that when the system bandwidth is scaled down, the PA (like the PA 70 in the BS 68 in FIG. 4) no longer needs to support the full bandwidth (i.e., the PA does not need to support additional sub-carriers associated with a full bandwidth-based transmission). Thus, the power consumption is correspondingly reduced in proportion to the reduction in the system bandwidth. Even though the total transmission power is reduced, the BS (e.g., the eNB 98 in FIG. 5, or any of the BS's in FIG. 6) may be configured to maintain the appropriate power spectral density of transmitted signals.

When a BS adjusts its DL transmission bandwidth (and, preferably also the bandwidth allotted to a UE for UL transmissions), the BS may transmit information about the new bandwidth over the system information broadcast channels (such as MIB and SIB). For example, in the LTE system, the MIB contains the DL-Bandwidth, Physical HARQ (Hybrid Automatic Repeat Request) Indicator Channel-Config (PHICH-Config), and SystemFrameNumber fields, and is broadcast in Broadcast Channel (BCH). The freqInfo (including UL-CarrierFreq, UL-Bandwidth, and additionalSpectrumEmission fields) may be broadcast in the System Information Block Type2 (SIB2) in Broadcast Control Channel (BCCH). In a multi-cell system, when a system-wide adjustment of transmission bandwidth is performed across all BS's in the system (e.g., individually by each BS, or through a system-wide central controller in the core network), this new bandwidth information (via MIB and SIB) is typically broadcast within each cell (by the cell-specific BS), but the overall system (having multiple cells) may need to be coordinated within the scope of the smallest cell/domain of the wireless system uniformly such that the transmission bandwidth is maintained to be the same—usually, across each subnet (such as, for example, the subnets 112 and 114 shown in FIG. 6) in the system.

Coordination of the system bandwidth adjustment across multiple cells in the system can be done in either of the following two ways (or a suitable combination of them, when appropriate). In the first method, all the BS's in the system can be configured to perform a pre-determined bandwidth adjustment in a static manner—e.g., with day-of-the-year, time-of-the-day bandwidth change. For example, each BS in the system may be configured to scale down its transmission bandwidth to the smallest available bandwidth (e.g., 1.4 MHz carrier in LTE) during late-night and early-morning hours (e.g., 12:00 AM-5:30 AM) (or any other pre-determined time intervals) each 24-hour week day of the year. This option may allow to address cell site-specific traffic patterns for each day of the year and each hour of the day, but it may require temporary adjustments or configuration changes if, for example, an irregular (or non-routine) event (e.g., a very high profile football game, or a party convention) is supposed to happen in a certain cell region or subnet.

In the second method, each BS in the system can be configured to actively/dynamically monitor the amount of user traffic within each respective cell. Similarly, system-wide user traffic (i.e., traffic within all cells in the overall system) also may be monitored dynamically through corresponding reports from each BS. Various amounts of user traffic may be associated with corresponding pre-determined loading levels. At certain (configurable) system loading levels, the system (or a particular BS in case of a single BS-specific bandwidth adjustment) may be programmed to automatically adjust the system/BS bandwidth to a (configurable) specific bandwidth corresponding to that loading level—i.e., the specific loading level to which to adjust (the bandwidth) can be configured by the operator. For example, rather than statically scaling down bandwidth regardless of current traffic conditions (as in case of the first method discussed above), in this second method, an operator may configure a BS to dynamically monitor its traffic (for example, every three hours) to actively determine its loading and adjust its carrier bandwidth accordingly. In one embodiment, the bandwidth may be adjusted, for example, based on a sliding scale in proportion to loading determination. For example, if there are 500 UE's actively communicating (and not merely camped on or in idle state) with a BS in a cell and if such loading is considered to be a "high" level of loading, then the same BS may determine—based on the BS's configuration by its operator—that it is operating at a "medium" level of loading when only 250 UE's are in active communication with the BS or at a "very low" level of loading when only 50 UE's are in active communication. In case of an LTE system, such BS may be configured to allocate the entire 20 MHz system bandwidth when facing this "high" level of loading, or scale the bandwidth down to 10 MHz when its loading falls to the "medium" level or to 5 MHz (or below) when its loading is close to "low" or "very low" level. Certain heuristics and filtering rules can again be applied to mitigate premature bandwidth adjustments and prevent such actions in specific cases, including special events, day and time considerations, etc. For example, a minimum system bandwidth values can be provisioned to prevent capacity and performance degradation when an unusually light traffic follows by a sharp traffic increase.

Usually, under the current standards, the transmission bandwidth of a wireless system may not be easily adjusted. Currently, at the UE registration time, a mobile system/BS determines the bandwidth utilized by the respective BS/system (which can be considered as a collection of BS's and UE's). For example, in the 3GPP LTE system, in keeping with the standards, the UE acquires the DL transmission bandwidth from its serving BS via the broadcast channel of the MIB. The UE then assumes that it can initially use the same bandwidth in the UL, and, later, the UE may acquire the actual UL bandwidth in the SIB broadcast (should it be different from that for the DL) from the BS. This DL and UL bandwidth information is part of the registration data of the UE. Thus, whenever the system/BS serving the UE changes the system/operating bandwidth, the UE may have to re-register within the system. Such re-registration may be required for all idle UEs within the system as well whenever their serving BS changes the operating bandwidth. Therefore, in one embodiment, again using LTE as an example, such frequent re-registrations may be prevented by ensuring that the system bandwidth is a dynamic parameter of the OTA communications protocols such that the UE can acquire the bandwidth value (from the system broadcast) and assume operations on the newly scaled bandwidth without having to re-register.

Figure 4:
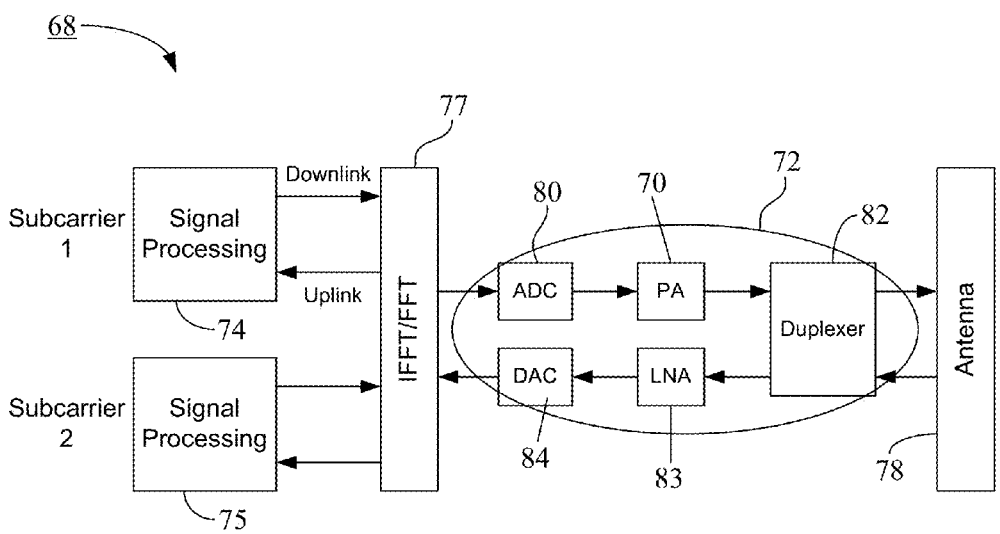
FIG. 4 is an exemplary block diagram of logical processing units of a BS that is operating in a single-carrier configuration.
Figure 9:
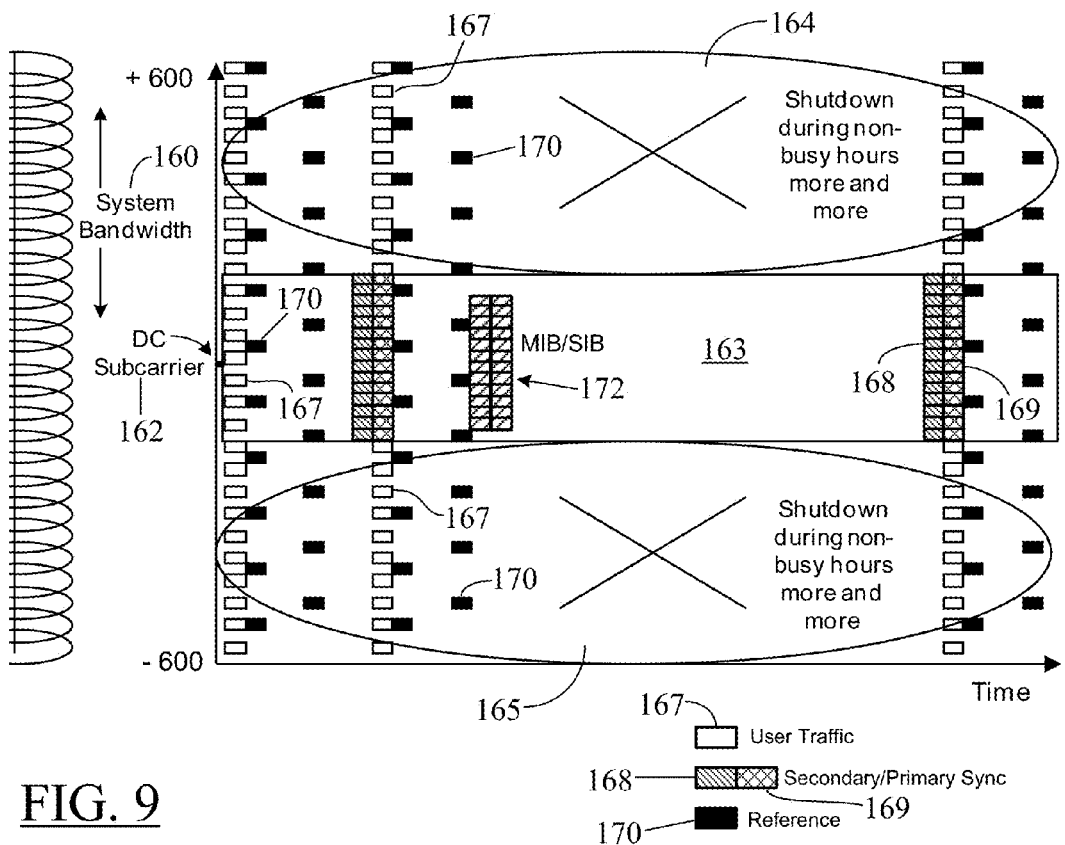
FIG. 9 illustrates scaling of scheduling bandwidth according to one embodiment of the present invention.

FIG. 9 illustrates scaling of scheduling bandwidth according to one embodiment of the present invention. It is observed here that in an FDM wireless system such as OFDMA (e.g., LTE) and FDMA (e.g., GSM) systems, the transmission resources can be sub-divided into a range of many frequencies. In one embodiment, when the loading of the system/BS is lower, the system/BS may be configured to explicitly cease transmission over part of the frequency spectrum so as to avoid expending power. For example, a 3GPP2 single-carrier LTE system (e.g., the system 88 in FIG. 5, or system 110 in FIG. 6, or any of the individual BS's (as applicable) shown in FIGS. 5-6) with 20 MHz spectrum (i.e., system bandwidth 160 shown in FIG. 9) consists of 1200 subcarriers (i.e., smaller chunks of frequencies), each of which can be transmitted independently (as shown in FIG. 4) and may be controlled so as to save power consumption over the subcarrier-specific frequency range. Hence, in one embodiment, during peak traffic hours (e.g., business hours during week days), the system normally maintains full power transmission over the complete spectrum. With reduced loading of the system, the system/BS may be configured to discontinue transmission over the contiguous ranges of the spectrum "left" and "right" of the center of the spectrum. For ease of reference, in FIG. 9, the 1200 subcarriers are shown in a symmetrical configuration around a "central" subcarrier 162 (which may be conveniently referred to as a Direct Current (DC) subcarrier). In FIG. 9, the "unblocked" central portion of the spectrum around this DC subcarrier 162 is illustrated by reference numeral "163", whereas reference numeral "164" is used to identify a "blocked" portion (also marked with an "X") of higher frequency subcarriers, and the reference numeral "165" is used to identify a "blocked" portion (also marked with an "X") of lower frequency subcarriers. The central portion 163 is maintained (or remains "unblocked") to continue system broadcast and to provide a required level of service during off-peak hours. In one embodiment, the size of the central spectrum 163 can be larger (e.g., corresponding to higher system loading), or smaller (e.g., corresponding to lower system loading). In the case of an LTE system, in the extreme situation of almost no loading, only the smallest resource block (in the central spectrum 163) may be maintained just for continuing transmission of system information broadcasts.

As an example, it is known that, in case of LTE, System Information (SI) may be divided into the MIB and a number of SIBs. The MIB includes a limited number of most essential and most frequently transmitted parameters that are needed to acquire other information from the cell, and is transmitted on BCH. The MIB uses a fixed schedule with a periodicity of 40 ms and repetitions made within 40 ms. SIBs other than SIB Type1 (or SIB1) may be carried in SI messages, and mapping of SIBs to SI messages is flexibly configurable by the scheduling InfoList parameter included in SIB Type1 message. The SIB Type1 message may configure the SI-window length and the transmission periodicity for the SI messages. The SIB Type2 message may always be mapped to that SI message which corresponds to the first entry in the list of SI messages in scheduling InfoList. There may be multiple SI messages transmitted with the same periodicity. SIB Type1 and all SI messages may be transmitted on Downlink Shared Channel (DL-SCH). The SIB Type 1 message may use a fixed schedule with a periodicity of 80 ms and repetitions made within 80 ms. The SI messages may be transmitted within periodically occurring time domain windows (referred to as SI-windows) using dynamic scheduling. Each SI message may be associated with an SI-window and the SI-windows of different SI messages may not overlap. That is, within one SI-window, only the corresponding SI may be transmitted. The length of the SI-window may be common for all SI messages, and may be configurable as well. Within an SI-window, the corresponding SI message can be transmitted a number of times in any subframe other than the following three subframes: (i) Multicast/Broadcast Single Frequency Network (MBSFN) subframes, (ii) uplink subframes in TDD mode, and (iii) subframe #5 of radio frames for which System Frame Number (SFN) mod 2=0.

In LTE, the primary and secondary synchronization signals, and the downlink reference signals are generally transmitted for cell search purpose so that a UE can acquire time and frequency synchronization with a BS in the cell and detect the Cell ID of that cell. The primary and secondary synchronization signals may be transmitted over the central seventy two (72) sub-carriers (e.g., sub-carriers in the central portion 163 in FIG. 9) in the first and sixth subframes of each DL radio frame (not shown).

Normally, even when there is no user data to transmit, the LTE system will maintain transmission of 3 categories of RF signals: (i) system information broadcast (including MIB over the central 72 sub-carriers and SIBs), (ii) Primary Sync (or Synchronization) Signal (PSS) and Secondary Sync Signal (SSS) (over the central 72 sub-carriers as mentioned before), and (iii) Reference Signals (or pilot signals) (RS) (across all 1200 sub-carriers). The system information broadcast, PSS and SSS, and RS may be maintained in order to ensure service availability in the respective cells of the network. The Reference Signals (RS's) may be transmitted (for each of the 1200 sub-carriers) in each Resource Block (RB) in a subframe (not shown)—i.e., 4 RS's out of 84 Resource Elements (RE's) of each Resource Block in a single transmit antenna or 2 transmit antenna configurations, and 10 RS's out of 84 RE's in a 4 transmit antenna configuration.

However, in contrast to the above-described transmissions of RS's and other auxiliary signals (e.g., SIBs), in Scheduling Bandwidth Scaling according to the embodiment in FIG. 9, only the PSS's, SSS's, and system broadcasts having fixed periodicity (i.e., MIB and SIB1) may be maintained as usual—i.e., over the central 72 sub-carriers. The other SIBs may be scheduled with reduced frequency during the off-peak hours (i.e., during lighter loading of a BS). Furthermore, the four (4) transmit antenna RS configuration may be reduced to 1 or 2 transmit antenna configuration so that the number of REs used for RS transmission may be reduced from 10 to 4 per Resource Block (RB). Furthermore, the references (i.e., RS's) may be terminated in all but the RB's of the central subcarriers (which may be the only sub-carriers that are maintained during off-peak hours). FIG. 9 illustrates this scaling aspect in a slightly more detail. In the exemplary LTE signaling configuration illustrated in FIG. 9, user traffic is illustrated by plain rectangles 167, secondary and primary synchronization signals (SSS and PSS) (only in the central portion 163) are identified by cross-hatched rectangles 168 and 169, respectively, reference or pilot signals (RS's) are identified by filled-in rectangles 170, and MIB/SIB messages (also only in the central portion 163) are collectively identified by hatched rectangles 172. Although RS's 170 are shown across all sub-carriers (as will be the situation in case of a traditional LTE system/BS), it is noted in the context of FIG. 9 that, when a spectral portion is blocked (e.g., the portions 164-165), even the reference signals 170 may not be transmitted on those blocked subcarriers. In other words, a traditional single-carrier LTE system may transmit RS's across all 1200 sub-carriers, but a system/BS configured according to particular embodiments of the present invention may completely terminate transmissions of RS's on those sub-carriers (and their corresponding spectral range) which are blocked based on the loading of the system/BS. Furthermore, in one embodiment, some auxiliary information-containing DL signals (such as synchronization signals (e.g., PSS, SSS), system broadcast signals (MIB, SIBs, etc.)) may also be blocked in the System Bandwidth Scaling aspect when the size of the "unblocked" central portion 163 shrinks to less than central 72 sub-carriers.

Similar to the System Bandwidth Scaling discussed above with reference to FIG. 8, in the Scheduling Bandwidth Scaling discussed with reference to FIG. 9, the ceasing of transmission over portions of frequencies can be done statically or dynamically. In either case, it may be adjusted by heuristics and filtering rules to prevent premature termination of transmissions (e.g., to accommodate temporary configuration changes that may arise in view of non-routine events such as a political party convention, a football game, etc.). It should be noted that although the examples discussed here and with reference to FIG. 9 are in the context of 3GPP LTE standards, the blocking of the transmission frequencies may be wireless technology dependent and, hence, may be suitably configured according to the technology (using the LTE-based discussion herein as reference).

As discussed above, in Scheduling Bandwidth Scaling in an LTE system, a BS may terminate all transmissions (i.e., DL transmissions as well as UL scheduling-related transmissions) on certain sub-carriers depending on the BS's loading. Hence, although the system bandwidth 160 associated with the single-carrier transmitted by the BS is thus reduced, the BS-transmitted single carrier may not contain all 1200 sub-carriers, but, instead, it transmits at a much reduced system bandwidth that occupies, for example, 1.4 MHz or 72 subcarriers. Whereas, in the System Bandwidth Scaling aspect discussed earlier with reference to FIG. 8, the single-carrier may still contain all 1200 sub-carriers even though the carrier only schedules all transmission over a reduced system bandwidth (of, e.g., 10 MHz, 5 MHz, etc.).

As mentioned earlier, in the current LTE standards, Reference Signals (RS's) must be transmitted always for all resource blocks (across all 1200 sub-carriers) whether or not the resource blocks are used to transmit user traffic. However, in certain embodiments of the present invention, as part of implementing the Scheduling Bandwidth Scaling aspect (discussed above with reference to FIG. 9), the LTE system/BS may be configured so that it can exchange messages with the UE to inform the UE of the limited set of resource blocks now available for DL transmission. (In the exemplary case of LTE, it is noted here that although LTE currently does not support such messaging, it can be enhanced to do so.) In an alternative embodiment, the wireless system/BS may still cease transmission of the RS's and achieve the primary objective of energy savings at a manageable expense of the UE reporting poor Channel Quality (via Channel Quality Indicator (CQI) bits in UL transmissions) for the RBs that do not have RS. However, since the wireless system, i.e., the base station, controls the DL RB allocation, it can avoid using these DL RBs altogether—thereby not only saving additional energy, but also preventing further poor Channel Quality reports from the UE because the RS-less RBs are now de-allocated.

It is observed that when Reference Signals (RS's) are shut down in some RBs (as discussed above), an eNB (e.g., the eNB 98 in FIG. 5) may not get usable DL channel quality report for these RBs because the CQI measurement (by a UE) is based on the RS measurement by the UE. Thus, the eNB may not be able to take advantage of frequency selectivity of the channel to schedule DL transmissions. Hence, as an alternative to the Scheduling Bandwidth Scaling aspect discussed above with reference to the LTE-based exemplary embodiment in FIG. 9, in one embodiment, the present invention may employ a method in which RS transmission may be maintained (by the eNB) on all the RBs (across all 1200 subcarriers in LTE) so that the eNB can obtain CQI report across the entire bandwidth (i.e., the system bandwidth 160 shown in FIG. 9). This method may be referred to as Scheduling Bandwidth Scaling without (terminating) Gating Reference and Auxiliary Channels. In this method, like the embodiment in FIG. 9, the wireless system/BS may maintain transmission over a smaller, but contiguous window of the supported spectrum (e.g., the central portion 163 shown in FIG. 9). However, in contrast with the embodiment in FIG. 9, the transmission of Reference Signals (RS's) or pilot signals may not be ceased in this alternative method—i.e., the sub-carriers in the "blocked" portions 164-165 (FIG. 9) may be now transmitted with RS's 170 even when the user traffic 167 remains blocked on these sub-carriers. Furthermore, in one embodiment, other auxiliary information—e.g., signals for synchronization, system broadcast signals, or SIBs other than SIB1, etc.—also may be scheduled as usual over the sub-carriers in the "unblocked" central portion 163 (FIG. 9).

Instead of maintaining a bandwidth window symmetrical around the DC subcarrier 162 (FIG. 9), in the Scheduling Bandwidth Scaling without (terminating) Gating Reference and Auxiliary Channels, the wireless system/BS can also slide the bandwidth window (away from the DC subcarrier 162 in either direction in FIG. 9) to select the best channel quality for scheduling DL transmissions. The sliding window may mean that the transmission between the BS and the UEs may occur at different ranges of frequencies at different times. In that case, the wireless system/BS may be configured to broadcast information about the current window to all UE's within its RF coverage. (In the exemplary case of LTE, it is noted here that although LTE currently does not support such broadcast by eNB, it can be enhanced to do so.) Such frequency scaling using a sliding window of frequencies may also mitigate some loss of frequency diversity that may arise when the bandwidth of a system is scaled down (as, for example, in the System Bandwidth Scaling, Scheduling Bandwidth Scaling, and Scheduling Bandwidth Scaling without Gating Reference and Auxiliary Channels aspects discussed herein).

Figure 10:
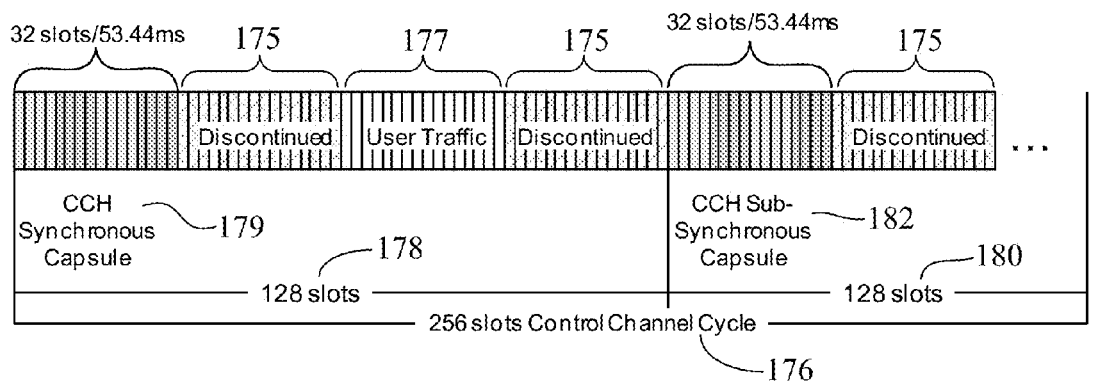
FIG. 10 is an exemplary illustration of scaling of system duty-cycle according to one embodiment of the present invention.

FIG. 10 is an exemplary illustration of scaling of system duty-cycle according to one embodiment of the present invention. In Time Division Multiplexed (TDM) wireless systems, such as CDMA2000 CDMA/HRPD, 3GPP WCDMA/HSPA, OFDMA (e.g., LTE), and FDMA (e.g., GSM) systems, the transmission resources may be sub-divided independently into a series of time segments or time slots, either across the full frequency spectrum or within individual frequencies (or sub-carriers). In one embodiment, when the loading of the system is lower, the system may be configured to explicitly cease transmission (in DL and/or UL) over the part of the time slots so as to avoid expending power. For example, as shown by way of example in FIG. 10, in the case of IS2000 (i.e., CDMA2000) CDMA/HRPD, the wireless system/BS (e.g., the eNB 98 in FIG. 5, or any one or more of the BS's in FIG. 6, or all BS's in systems 88 and 110 in FIGS. 5 and 6, respectively, etc.) may cease transmission over even time slots 175 of all the time slots 176 that may carry user traffic (like time slots 177). Such selective termination of transmission may entail more than halving the power consumption of the system. In FIG. 10, for ease of illustration, all "discontinued" time-slots (i.e., time-slots where transmission may be ceased) are identified by the same reference numeral "175" even though these time slots occur at different temporal instances.

It is noted here that, in the exemplary CDMA2000 CDMA/HRPD time slot structure illustrated in FIG. 10, the transmission spectrum 176 may be actually subdivided into two portions: (i) In the first portion 178 of 128 time slots, a common Control Channel (CCH) Synchronous Capsule 179 (of 32 time slots or 53.44 ms duration) may be transmitted. This common CCH 179 may be maintained to allow for system information broadcast (though user traffic may also be carried in the time slots of common CCH 179 when these time slots are idle). (ii) In the second portion 180 (also of 128 time slots), only user traffic may be transmitted, and can be saved (i.e., transmission of user traffic over the slots in the second portion 180 may be ceased) when the loading in the cell is low. However, as shown in FIG. 10, the control messages (or CCH) may be transmitted in the Synchronous Capsules 179 as well as Sub-sync Capsules 182 of a control (and traffic) channel cycle 176. Therefore, time slots of these capsules 179, 182 may not be discontinued for transmission. However, some or all the slots for user traffic (e.g., slots 175 and 177 in FIG. 10) can still be "turned off" by agreement between the BS/BTS and the UE to save power. For example, if current CDMA/HRPD, WCDMA/HSPA, OFDMA (e.g., LTE and WiMAX) standards do not support discontinuous transmission of specific time slots, then, in certain embodiments of the System Duty-Cycle Scaling aspect discussed above, the system/BS may be configured to communicate to a UE (that is operating in the system and in communication with the BS) information about the time slots where transmission is withheld (e.g., in DL as well as in UL). The UE, in turn, also may be configured to acknowledge such reduced-transmission arrangement and operate accordingly in the UL. (In the exemplary case of LTE, it is noted here that although LTE currently does not support such messaging between a BS and a UE, it can be enhanced to do so.)

In the System Duty-Cycle Scaling aspect discussed here with reference to FIG. 10, the number of time slots that can be "saved" (or "discontinued") from transmission may be smaller when system loading is higher, and larger when system loading is lower. In the extreme situation (i.e., minimal or very low system loading), for example, in the case of time slots in CDMA2000 CDMA/HRPD as shown in FIG. 10, only the common Control Channels 179 may need to be transmitted for system information broadcast and also to serve user traffic; all other time-slots (e.g., time slots 175, 177, and 182 in FIG. 10) may remain "discontinued" until a different system loading requires a different configuration.

It is noted that this System Duty-Cycle Scaling aspect may be well-suited for a TDD based wireless technology such as Time Division LTE (TD-LTE). In such a system, the same frequencies may be shared both in the DL and in the UL. The wireless system or BS may allocate DL and UL resources across the full frequency spectrum in time slots corresponding to the DL and UL, depending on the respective data need. However, the system/BS may be configured to withhold allocation of some time slots in DL and/or UL (including discontinuing the reference and other control signals) in a manner similar to that discussed earlier with reference to FIG. 10. Hence, the system can achieve power conservation objectives for the BTS transmitter.

It is understood that power conservation within a wireless system is cumulative—i.e., the total power savings may come from a variety of means and methods employed by the network operator. Hence, various power conservation methods discussed above with reference to exemplary FIGS. 7-10 may be treated as part of the overall energy conservation effort. Furthermore, if so desired, the methods of various embodiments of the present invention may be suitably combined (where technically feasible) for optimum power conservation.

The expected power savings may vary between different wireless technologies. In the best case, using LTE as an example, the power savings may be up to 90% when transmission (via a PA, such as the PA 70 in FIG. 4) takes place over only 1.4 MHz of the total 20 MHz bandwidth (90%= (20–1.4)/20 MHz). It is assumed in this calculation that without power savings (using one of the methodologies discussed herein), the DL scheduler in a BS (e.g., the scheduler 208 shown in FIG. 12) may spread transmission across the entire 20 MHz spectrum in order to reach the full coverage area of the cell.

Figure 11:
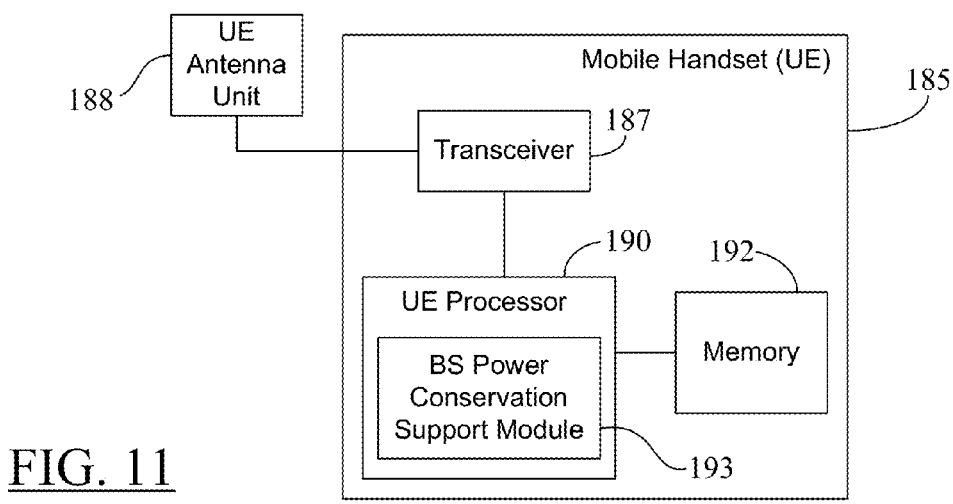
FIG. 11 is a block diagram of an exemplary mobile handset or UE according to one embodiment of the present invention.

FIG. 11 is a block diagram of an exemplary mobile handset or UE 185 according to one embodiment of the present invention. The UE 185 may represent either of the UE's 90 and 93 in FIG. 5, and may be configured to assist a BS in implementing various power conservation mechanisms discussed earlier in conjunction with FIGS. 7-10. As shown in FIG. 11, the UE or mobile device 185 may include a transceiver 187, an antenna unit 188 (e.g., the antenna unit 91 in case of UE 90, or the antenna unit 94 in case of UE 93, etc.), a processor 190, and a memory 192 (which may, in some embodiments, also include memory on UE's Subscriber Identity Module (SIM) card). The antenna unit 188 may include a single or multiple antennas. Because the UE 185 may receive communications from a BS (e.g., the eNB 98 in FIG. 5) regarding one or more scaled transmission resources (e.g., system-wide frequency bandwidth, scheduling bandwidth, or system duty-cycle) as per certain embodiments of the present invention, the UE 185 in the embodiment of FIG. 11 may also include a BS Power Conservation Support module 193 (which may be configured to enable the UE 185 to receive, "interpret," and process power conservation-related transmissions from the respective BS). The module 193 may be a part of the UE's processor unit 190 as shown, or may be a separate unit coupled to the processor 190 and/or the transceiver 187, and configured to perform the tasks "expected" of a UE in the embodiments of FIGS. 8-10 through a combination of the processor 190, the transceiver 187, the antenna unit 188, and the memory 192. For example, the module 193 may acquire value of the scaled system bandwidth (as broadcast by a respective BS in System Bandwidth Scaling discussed earlier with reference to FIG. 8) through a combination of the antenna unit 188 and the transceiver 187, store the received bandwidth value in the memory 192, and configure the processor 190 to assume UL operations on this new bandwidth. Other arrangements to implement the functionality of the module 193 in the UE 185 may be devised as well. In particular embodiments, some or all of the functionalities described above in conjunction with a UE configured to support BS power conservation as disclosed herein may be provided by the UE processor 190 (with processing support from the module 193, as needed) executing instructions stored on a computer-readable medium, such as the memory 192 shown in FIG. 11. Alternative embodiments of the UE 185 may include additional components beyond those shown in FIG. 11 that may be responsible for enabling the UE's 185 communication with a base station (e.g., the eNB 98 in the network 96) and for providing certain aspects of the UE's functionality, including any of the functionality described above and/or any functionality necessary to support the solution described above.

Figure 12:
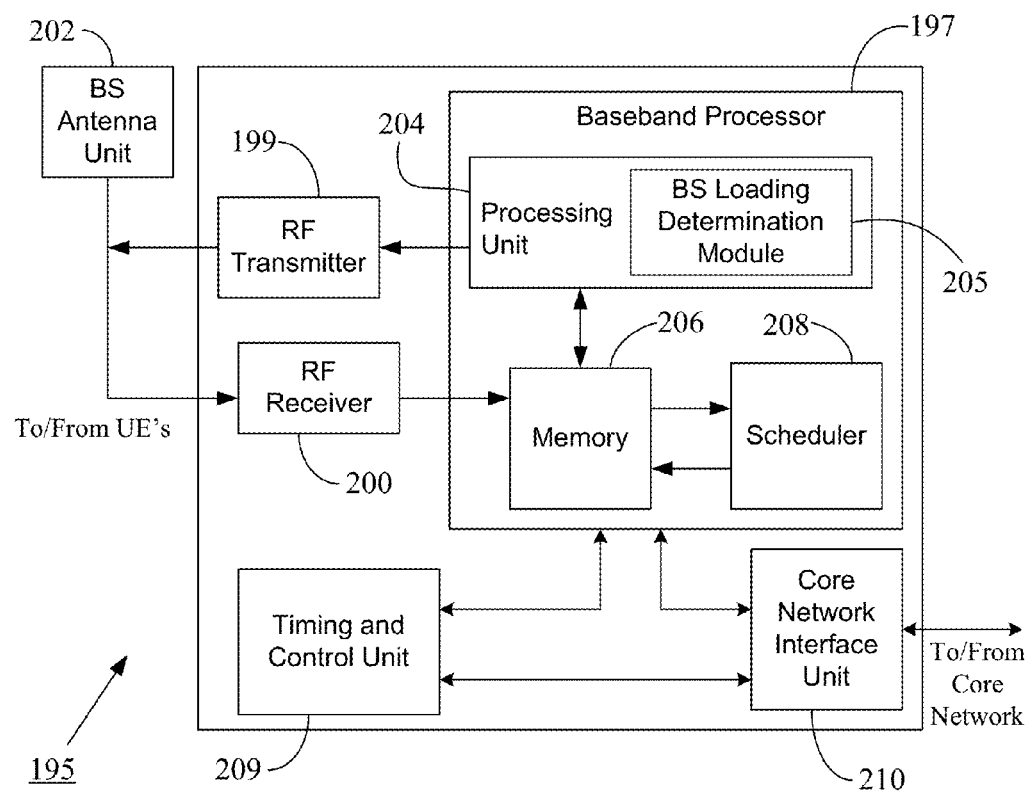
FIG. 12 is a block diagram of an exemplary eNB or a similar wireless access node (or base station) according to one embodiment of the present invention.

FIG. 12 is a block diagram of an exemplary eNB or a similar wireless access node (or base station) 195 according to one embodiment of the present invention. The eNB 195 may be a single-carrier wireless transmission unit and may represent any of the base stations 68 (in FIG. 4), 98 (in FIG. 5) or 126-133 (in FIG. 6), and may be configured to perform power conservation as per the flowchart 144 in FIG. 7 and as per the exemplary embodiments discussed with reference to FIGS. 8-10. The eNB 195 may include a baseband processor 197 to provide radio interface with the mobile handsets (e.g., UEs 90, 93 in the carrier network 96 in FIG. 5) via eNB's Radio Frequency (RF) transmitter 199 and RF receiver 200 units coupled to the eNB's antenna unit 202 (e.g., the antenna unit 105 shown in FIG. 5). In one embodiment, the processor 197 may receive transmissions (e.g., confirmations of receipt eNB-sent information about scaled transmission resources, acknowledgments to operate on a scaled transmission resource, CQI reports, and other UL signals) from the UEs (e.g., UEs 90, 93 in FIG. 5) via the combination of the antenna unit 202 and the receiver 200, whereas eNB's single-carrier based transmissions to the UEs (e.g., UEs 90, 93 in FIG. 5) may be carried out via the combination of the antenna unit 202 and the transmitter 199. The processor 197 may be configured (in hardware and/or software) to perform power conservation as disclosed herein. In that regard, the processor 197 may include a processing unit 204 having a BS loading determination module 205 to perform BS loading-based power conservation. In one embodiment, the loading determination module 205 may be a separate unit coupled to the processing unit 204 and/or at least the RF transmitter 199 to perform the desired power conservation-related transmissions to UEs. In another embodiment, various power conservation aspects discussed earlier with reference to exemplary FIGS. 7-10 may be implemented using the module 205 in combination with the processing unit 204, the RF transmitter 199, the RF receiver 200, the antenna unit 202, and a memory 206 (which may be part of the processor 197 as well). For example, the module 205 may determine BS's 195 loading (statically or dynamically as discussed earlier), the processing unit 204 may then determine how much a transmission resource (e.g., system bandwidth, scheduling bandwidth, or system duty-cycle) can be scaled based on the most-recent BS loading determination by the module 205, the processing unit 204 may store scaled value of the transmission resource in the memory 206 and may also transmit that value to one or more UE's (e.g., UEs 90, 93 in FIG. 5) via the combination of the transmitter unit 199 and the antenna unit 202. Similarly, as mentioned before, communications from UEs may be received (via the antenna unit 202 and the receiver 200) and stored in the memory 206 for further processing by the processing unit 204. Other arrangements to implement the functionality of the loading determination module 205 in the base station or access point 195 in FIG. 12 may be devised as well. For example, in one embodiment, the functionality of the module 205 may be implemented in an external component such as, for example, a BSC or a gateway/control node (e.g., the control node 137 in FIG. 6). In another embodiment, the core network (e.g., the core network 103 in FIG. 5 or the core network 140 in FIG. 6) itself may implement BS loading determination functionality to perform system-wide loading determination of all BS's in the system (e.g., the system 88 in FIG. 5 or the system 110 in FIG. 6).

The processing unit 204 may be in communication with the memory 206 to process and store relevant information for the cell (e.g., current bandwidth assigned to the single carrier transmitted by the BS 195, BS's peak traffic hours, etc.). A scheduler (e.g., the scheduler 208 in FIG. 12) may be part of the eNB's 195 processor 197 and may provide the scheduling decisions for UEs (e.g., UEs 90, 93 etc.) based on a number of factors such as, for example, QoS (Quality of Service) parameters, UE buffer status, uplink channel feedback report received from UEs, UE capabilities, etc. The scheduler 208 may have the same data structure as a typical scheduler in an eNB in an LTE system. The processor 197 may also provide additional baseband signal processing (e.g., mobile device registration, channel signal information transmission, radio resource management, etc.) as required. The processing unit 204 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above (e.g., BS loading determination using module 205; transmission of information related to scaled resources and reception of acknowledgment signals from UEs using antennas in the antenna unit 202 and RF transmitter and receiver 199-200; storage of BS loading and scaled resource values in the memory 206 of the processor 197; etc.) as being provided by a base station or another entity having similar functionality (such as a wireless access node/point, a mobile base station, a base station controller, a node B, an enhanced node B, an HeNB, a home base station, a femtocell base station, and/or any other type of mobile communications node) may be provided by the processing unit 204 (with processing support from the module 205, as needed) executing instructions stored on a computer-readable data storage medium, such as the memory 206 shown in FIG. 12.

The eNB 195 may further include a timing and control unit 209 and a core network interface unit 210 as illustrated in FIG. 12. The control unit 209 may monitor operations of the processor 197 and the network interface unit 210, and may provide appropriate timing and control signals to these units. The interface unit 210 may provide a bi-directional interface for the eNB 195 to communicate with a core network (e.g., the core network 103 in the embodiment of FIG. 5) to facilitate administrative and call-management functions for mobile subscribers operating in the corresponding carrier network (e.g., the carrier network 96 in FIG. 5) through eNB 195.

Alternative embodiments of the base station 195 may include additional components responsible for providing additional functionality, including any of the functionality identified above and/or any functionality necessary to support the solution described above. Although features and elements are described above in particular combinations, each feature or element can be used alone without the other features and elements or in various combinations with or without other features and elements. The methodology provided herein (related to power conservation in a single-carrier wireless transmission system) may be implemented in a computer program, software, or firmware incorporated in a computer-readable storage medium (e.g., the memory 192 in FIG. 11 or the memory 206 in FIG. 12) for execution by a general purpose computer or a processor (e.g., the processor 190 in FIG. 11 or the processing unit 204 in FIG. 12). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

As mentioned before, elements (e.g., core networks 103 in FIGS. 5 and 140 in FIG. 6, gateway nodes 137-138 in FIG. 6, etc.) other than BS's in the systems 88 (FIG. 5) and 110 (FIG. 6) may be configured—like the BS 195 in FIG. 12—to perform system-wide determination of loading of BS's in the system and, preferably, to also perform system-wide power conservation (e.g., through coordination of power conservation at each individual BS in the system) using the methodology shown in the flowchart of FIG. 7 and discussed in more detail with reference to exemplary FIGS. 8-10.

The foregoing describes a method and mechanism to reduce the energy consumption of a single-carrier wireless transmission system (such as a base station, a subnet of multiple base stations, etc.) in relation to the loading of the system. Energy savings may be achieved by withholding the transmission of the system over some time slots, decreasing the available frequencies for user traffic transmission, dynamically adjusting the system to a lower bandwidth, or a combination of these aspects, in proportion to the system transmission load at a given time. The lower the system load, the more transmission resources may be withheld or reduced, and, hence, the more savings in energy consumption. Energy savings may be most prominent during non-busy hours (e.g., mid-night to early morning) of the single carrier-based wireless transmission system.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of controlling power consumption of a Base Station (BS) that is part of a wireless system and configured to provide Radio Frequency (RF) coverage over a geographical region associated therewith in the wireless system, wherein the method comprises performing the following steps using the BS: determining a transmission load of the BS for transmitting Downlink (DL) RF signals to one or more User Equipments (UEs) in the wireless system within the RF coverage region of the BS, wherein the BS is operating in a single-carrier configuration that employs a single Power Amplifier (PA) and a single Transmit/Receive (Tx/Rx) chain to transmit and receive RF signals using one or more subcarriers that are available to the BS over an entire frequency spectrum associated with the BS in the wireless system; and in proportion to a loading of the BS, varying an amount of an RF transmission resource available to the BS for DL transmissions; wherein the RF transmission resource is a series of time segments allocated by the BS for DL and Uplink (UL) transmissions in the wireless system at a specific subcarrier frequency, and wherein the step of varying the amount of the RF transmission resource includes at least one of the following: increasing or decreasing a number of time segments for DL transmissions in proportion to the loading of the BS; and increasing or decreasing the number of time segments for UL transmissions in proportion to the loading of the BS, wherein the increasing or decreasing steps are performed without signaling the increasing or decreasing of the number of time segments to the UEs within the coverage region of the base station.

2. The method of claim 1, wherein the step of determining the transmission load of the BS comprises:
statically considering the transmission load of the BS to be light during one or more predetermined time intervals within a 24-hour day.

3. The method of claim 1, wherein the step of determining the transmission load of the BS comprises:
associating each of a plurality of pre-determined loading levels to a corresponding different amount of communication between the BS and the one or more UEs;
actively monitoring the amount of communication between the BS and the one or more UEs; and
dynamically assigning one of the plurality of pre-determined loading levels to the BS depending on the monitored amount of communication between the BS and the one or more UEs.

4. The method of claim 1, wherein the step of varying the amount of the RF transmission resource includes at least one of the following:
increasing the available amount of the RF transmission resource when the loading of the BS is higher; and
decreasing the available amount of the RF transmission resource when the loading of the BS is lower.

5. A method of operating a base station (BS) that is part of a wireless system and configured to provide Radio Frequency (RF) coverage over a geographical region associated therewith in the wireless system, the method comprising the steps of: determining a transmission load of the BS for transmitting Downlink (DL) RF signals to one or more User Equipments (UEs) in the wireless system within the RF coverage region of the BS, wherein the BS is operating in a single-carrier configuration that employs a single Power Amplifier (PA) and a single Transmit/Receive (Tx/Rx) chain to transmit and receive RF signals using one or more subcarriers that are available to the BS over an entire frequency spectrum associated with the BS in the wireless system; and in proportion to a loading of the BS, varying an amount of an RF transmission resource available to the BS for DL transmissions and shared with the one or more UEs for Uplink (UL) transmissions to the BS; wherein the RF transmission resource is a series of time segments allocated by the BS for DL and Uplink (UL) transmissions in the wireless system at a specific subcarrier frequency, and wherein the step of varying the amount of the RF transmission resource includes at least one of the following: increasing or decreasing a number of time segments for DL transmissions in proportion to the loading of the BS; and increasing or decreasing the number of time segments for UL transmissions in proportion to the loading of the BS; wherein the increasing or decreasing steps are performed without signaling the increasing or decreasing of the number of time segments to the UEs within the coverage region of the base station.

6. The method of claim 5, wherein the step of varying the amount of the RF transmission resource includes at least one of the following:
increasing the available amount of the RF transmission resource when the loading of the BS is higher; and
decreasing the available amount of the RF transmission resource when the loading of the BS is lower.

7. A Base Station (BS) that is part of a wireless system and configured to perform the following: provide Radio Frequency (RF) coverage over a geographical region associated with the BS in the wireless system; determine a transmission load of the BS for transmitting Downlink (DL) RF signals to one or more User Equipments (UEs) in the wireless system within the RF coverage region of the BS, wherein the BS is operating in a single-carrier configuration that employs a single Power Amplifier (PA) and a single Transmit/Receive (Tx/Rx) chain to transmit and receive RF signals using one or more subcarriers that are available to the BS over an entire frequency spectrum associated with the BS in the wireless system; and in proportion to a loading of the BS, vary an amount of an RF transmission resource available to the BS for DL transmissions and to the one or more UEs for Uplink (UL) transmissions to the BS; wherein the RF transmission resource is a series of time segments allocated by the BS for DL and UL transmissions in the wireless system at a specific subcarrier frequency, and wherein the step of varying the amount of the RF transmission resource includes at least one of the following: increasing or decreasing a number of time segments for DL transmissions in proportion to the loading of the BS; and increasing or decreasing the number of time segments for UL transmissions in proportion to the loading of the BS, wherein the increasing or decreasing steps are performed without signaling the increasing or decreasing of the number of time segments to the UEs within the coverage region of the base station.

8. The BS of claim 7, wherein the BS is further configured to perform at least one of the following as part of determining the transmission load thereof:
statically assign a pre-determined loading level for the transmission load without actively monitoring the amount of communication between the BS and the one or more UEs; and
dynamically assign one of a plurality of pre-determined loading levels for the transmission load based on active monitoring of the amount of the communication between the BS and the one or more UEs.

9. The BS of claim 7, wherein the BS is further configured to perform at least one of the following as part of varying the amount of the RF transmission resource:
increase the available amount of the RF transmission resource when the loading of the BS is higher; and
decrease the available amount of the RF transmission resource when the loading of the BS is lower.

10. A wireless system comprising: a Base Station (BS) configured to provide Radio Frequency (RF) coverage over a geographical region associated with the BS in the wireless system; and a User Equipment (UE) in the wireless system within the RF coverage region of the BS; wherein the BS is configured to perform the following: determine a transmission load of the BS for transmitting Downlink (DL) RF signals to the UE, wherein the BS is operating in a single-carrier configuration that employs a single Power Amplifier (PA) and a single Transmit/Receive (Tx/Rx) chain to transmit and receive RF signals using one or more subcarriers that are available to the BS over an entire frequency spectrum associated with the BS in the wireless system, and in proportion to a loading of the BS, vary an amount of an RF transmission resource available to the BS for DL transmissions and to the UE for Uplink (UL) transmissions to the BS; and wherein the UE is configured to commence the UL transmissions to the BS using a most-recent available amount of the RF transmission resource; wherein the RF transmission resource is a series of time segments allocated by the BS for DL and UL transmissions in the wireless system at a specific subcarrier frequency, and wherein the step of varying the amount of the RF transmission resource includes at least one of the following: increasing or decreasing a number of time segments for DL transmissions in proportion to the loading of the BS; and increasing or decreasing the number of time segments for UL transmissions in proportion to the loading of the BS, wherein the increasing or decreasing steps are performed without signaling the increasing or decreasing of the number of time segments to the UEs within the coverage region of the base station.

* * * * *

UNITED STATES PATENT AND TRADEMARK OFFICE
CERTIFICATE OF CORRECTION

PATENT NO.           : 9,282,509 B2                              Page 1 of 1
APPLICATION NO.      : 13/444277
DATED                : March 8, 2016
INVENTOR(S)          : Cao et al.

It is certified that error appears in the above-identified patent and that said Letters Patent is hereby corrected as shown below:

In the specification,

In Column 2, Line 51, delete "(ADC) 50-51," and insert -- (ADC) 51-52, --, therefor.

In Column 3, Line 67, delete "ADC 78," and insert -- ADC 80, --, therefor.

In Column 24, Line 24, delete "FIGS. 5" and insert -- FIG. 5 --, therefor.

In the claims,

In Column 25, Line 66, in Claim 5, delete "BS;" and insert -- BS, --, therefor.

Signed and Sealed this
Twenty-first Day of June, 2016

Michelle K. Lee
*Director of the United States Patent and Trademark Office*